(12) United States Patent
Moskowitz

(10) Patent No.: US 7,159,116 B2
(45) Date of Patent: Jan. 2, 2007

(54) SYSTEMS, METHODS AND DEVICES FOR TRUSTED TRANSACTIONS

(75) Inventor: Scott A. Moskowitz, Miami, FL (US)

(73) Assignee: Blue Spike, Inc., Sunny Isles Beach, FL (US)

( * ) Notice: Subject to any disclaimer, the term of this patent is extended or adjusted under 35 U.S.C. 154(b) by 1016 days.

(21) Appl. No.: 09/731,040

(22) Filed: Dec. 7, 2000

(65) Prior Publication Data

US 2002/0010684 A1    Jan. 24, 2002

Related U.S. Application Data

(60) Provisional application No. 60/234,199, filed on Sep. 20, 2000, provisional application No. 60/169,274, filed on Dec. 7, 1999.

(51) Int. Cl.
*H04L 9/00*    (2006.01)

(52) U.S. Cl. .................. 713/176; 380/231; 705/51; 705/52; 705/53; 705/54; 705/64; 705/77

(58) Field of Classification Search ............ 380/231; 705/51–54, 64, 77; 713/176, 200; 726/3
See application file for complete search history.

(56) References Cited

U.S. PATENT DOCUMENTS

| | | | |
|---|---|---|---|
| 5,428,606 A | 6/1995 | Moskowitz | |
| 5,539,735 A | 7/1996 | Moskowtiz | .................. 370/60 |
| 5,613,004 A | 3/1997 | Cooperman et al. | |
| 5,687,236 A | 11/1997 | Moskowitz et al. | .......... 380/28 |
| 5,745,569 A | 4/1998 | Moskowitz et al. | ........... 380/4 |
| 5,748,783 A * | 5/1998 | Rhoads | ....................... 382/232 |

(Continued)

FOREIGN PATENT DOCUMENTS

WO    96/29795    9/1996

(Continued)

OTHER PUBLICATIONS

Sirbu, Marvin and J.D. Tygar. "NetBill: An Internet Commerce System Optimized for Network Delivered Services," *Digest of Papers of the Computer Society Computer Conference (Spring)*, Compcon, US, Los Alamitos, IEEE Comp. Sox. Press, vol. CONF. 40, Mar. 5, 1995, pp. 20-25.

(Continued)

*Primary Examiner*—Emmanuel L. Moise
*Assistant Examiner*—Paul Callahan

(57) ABSTRACT

The invention discloses a system for enhancing trust in transactions, most particularly in remote transactions between a plurality of transactional parties, for instance a seller and buyer(s) of goods and/or services over a public computer network such as the internet. Trust is disclosed to be a multivalent commodity, in that the trust that is to be enhanced relates to information about the subject matter of the transactions (e.g., the suitability of the goods and services sold), the bona fides of the supplier of the goods and services, the appropriateness of a pricing structure for a particular transaction or series of transactions, a quantum of additional transactional value that may be imparted to the transactional relationship, security of information exchange, etc. An important contributor to trust for such aspects of the transaction is disclosed to be the use of highly-secure steganographic computer processing means for data identification, authentication, and transmission, such that confidence in the transaction components is enhanced. By providing an integrated multivalent system for enhancing trust across a variety of categories (for a variety of transaction species, including those in which the need for trust is greater on the part of one party than of another, as well as those in which both require substantial trust enhancement), the invention reduces barriers to forming and optimizing transactional relationships.

21 Claims, 13 Drawing Sheets

U.S. PATENT DOCUMENTS

| | | | |
|---|---|---|---|
| 5,790,677 A | 8/1998 | Fox et al. | 380/24 |
| 5,822,432 A | 10/1998 | Moskowitz et al. | |
| 5,889,868 A | 3/1999 | Moskowitz et al. | |
| 5,903,721 A | 5/1999 | Sixtus | 395/187.01 |
| 5,905,800 A | 5/1999 | Moskowitz et al. | |
| 6,078,664 A | 6/2000 | Moskowitz et al. | |
| 6,185,683 B1 * | 2/2001 | Ginter et al. | 713/176 |
| 6,205,249 B1 | 3/2001 | Moskowitz | |
| 6,522,767 B1 | 2/2003 | Moskowitz et al. | |
| 6,598,162 B1 | 7/2003 | Moskowitz | |

FOREIGN PATENT DOCUMENTS

| | | |
|---|---|---|
| WO | WO 96 29795 | 9/1996 |
| WO | 97/24833 | 7/1997 |
| WO | WO 97 24833 | 7/1997 |

OTHER PUBLICATIONS

Schunter, M., et al. "A status report on the SEMPER framework for secure electronic commerce," *Computer Networks and ISDN Systems*, North Holland Publishing, Amsterdam, vol. 30, No. 16-18, Sep. 30, 1998, pp. 1501-1510.

Konrad, K., et al. "Trust and Electronic Commerce—More Than A Technical Problem," *Proceedings of the 18th IEEE Symposium on Reliable Distributed Systems*, Lausanne, Switzerland, Oct. 19-22, 1999, pp. 360-365.

Kini, Anil and Joobin Choobineh. "Trust in Electronic Commerce: Definition and Theoretical Considerations," *Proceedings of the Thirty-First Hawaii International Conference on System Sciences* (CAT No. 98TB100216), Kohala Coast, HI, USA, Jan. 6-9, 1998, pp. 51-61.

Steinauer, D., et al. "Trust and Traceability in Electronic Commerce," *Standard View*, Sep. 1997, ACM, USA, vol. 5, No. 3, pp. 118-124.

International Search Report, completed by P. Corcoran on Mar. 20, 2001, mailed Apr. 4, 2001.

Sirbu, M. et al: "Netbill: An Internet Commerce System Optimized for Network Delivered Services," Digest of Papers of the Computer Society Computer Conference (Spring), Mar. 5, 1995, pp. 20-25, vol. CONF. 40, COMPCON, US, Los Alamitos, IEEE Comp. Soc. Press.

Schunter M. et al., "A status report on the Semper framework for secure electronic commerce," Computer Networks and ISDN Systems, Sep. 30, 1998, pp. 1501-1510, vol. 30, No. 16-18, NL, North Holland Publishing, Amsterdam.

Konrad, K. et al., "Trust and electronic commerce-more than a technical problem," Proceedings of the 18th IEEE Symposium on Reliable Distributed Systems, Oct. 19-22, 1999, pp. 360-365, Lausanne, Switzerland.

Kini, A. et al., "Trust in electronic commerce: definition and theoretical considerations," Proceedings of the Thirty-first Hawaii International Conference on System Sciences (Cat. No. 98TB100216), Jan. 6-9, 1998, pp. 51-61, Los Alamitos, CA, USA, IEEE Comput. Soc.

Steinauer D.D. et al., "Trust and traceability in electronic commerce," Standard View, Sep. 1997, pp. 118-124, vol. 5, No. 3, ACM, USA.

Pending U.S. Appl. No. 08/999,766, filed Jul. 23, 1997, titled "Steganographic Method and Device," assignee Wistaria Trading, Inc.

Pending U.S. Appl. No. 09/456,319, filed Dec. 8, 1999, titled "Transform Implementation of Digital Watermarks," assignee Wistaria Trading, Inc.

Pending U.S. Appl. No. 08/674,726, filed Jul. 2, 1996, titled "Exchange Mechanisms for Digital Information Packages with Bandwidth Securitization, Multichannel Digital Watermarks, and Key Management," assignee Wistaria Trading, Inc.

Pending U.S. Appl. No. 09/545,589, filed Apr. 7, 2000, titled "Method and System for Digital Watermarking," assignee Wistaria Trading, Inc.

Pending U.S. Appl. No. 09/594,719, filed Jun. 16, 2000, titled "Utilizing Data Reduction in Steganographic and Cryptographic Systems," inventor: Moskowitz et al.

Pending U.S. Appl. No. 09/731,040, filed Dec. 7, 2000, titled "Systems, Methods and Devices for Trusted Transactions," assignee Blue Spike.

Pending U.S. Appl. No. 10/049,101, filed Feb. 8, 2002, titled "A Secure Personal Content Server," assignee Blue Spike.

Pending U.S. Appl. No. 09/657,181, filed Sep. 7, 2000, titled "Method and Device for Monitoring and Analyzing Signals," assignee Blue Spike.

Pending U.S. Appl. No. 09/671,739, filed Sep. 29, 2000, titled "Method and Device for Monitoring and Analyzing Signals," assignee Blue Spike.

Pending U.S. Appl. No. 09/956,262, filed Sep. 20, 2001, titled "Improved Security Based on Subliminal and Supraliminal Channels for Data Objects," assignee Blue Spike.

Pending U.S. Appl. No. 09/731,039, filed Dec. 7, 2000, titled "System and Method for Permitting Open Access to Data Objects and For Securing Data within the Data Objects," assignee Blue Spike.

Pending U.S. Appl. No. 10/369,344, filed Feb. 18, 2003, titled "Optimization Methods for the Insertion, Protection, and Detection of Digital Watermarks in Digital Data," assignee Wistaria Trading.

Pending U.S. Appl. No. 09/789,711, filed Feb. 22, 2001, titled "Optimization Methods for the Insertion, Protection and Detection of Digital Watermarks," assignee Wistaria Trading.

Pending U.S. Appl. No. 09/644,098, filed Aug. 23, 2000, titled "Multiple Transform Utilization and Application for Secure Digital Watermarking," inventor S. Moskowitz.

Pending U.S. Appl. No. 09/767,733, filed Jan. 24, 2001, titled "Multiple Transform Utilization and Application for Secure Digital Watermarking," inventor S. Moskowitz.

Pending U.S. Appl. No. 10/417,231, filed Apr. 17, 2003, titled "Method, System and Devices for Packet Watermarking and Efficient Provisioning of Bandwidth," inventor S. Moskowitz.

Pending U.S. Appl. No. 10/602,777, filed Jun. 25, 2003, titled "Method for Combining Transfer Function with Predetermined Key Creation," inventor S. Moskowitz.

* cited by examiner

SYSTEMS, METHODS AND DEVICES FOR TRUSTED TRANSACTIONS

CROSS-REFERENCE TO RELATED APPLICATIONS

This application claims the benefit of pending U.S. patent application Ser. No. 08/674,726, filed Jul. 2, 1996, entitled "Exchange Mechanisms for Digital Information Packages with Bandwidth Securitization, Multichannel Digital Watermarks, and Key Management"; pending U.S. patent application Ser. No. 08/999,766, filed Jul. 23, 1997, entitled "Steganographic Method and Device"; pending U.S. patent application Ser. No. 09/046,627, filed Mar. 24, 1998, entitled "Method for Combining Transfer Function with Predetermined Key Creation"; pending U.S. patent application Ser. No. 09/053,628, filed Apr. 2, 1998, entitled "Multiple Transform Utilization and Application for Secure Digital Watermarking"; pending U.S. patent application Ser. No. 09/281,279, filed Mar. 30, 1999, entitled "Optimization Methods for the Insertion, Protection, and Detection of Digital Watermarks in Digital Data"; pending U.S. Provisional Application No. 60/169,274, filed Dec. 7, 1999, entitled "Systems, Methods And Devices For Trusted Transactions"; pending U.S. patent application Ser. No. 09/456,319, filed Dec. 8, 1999, entitled "Z-Transform Implementation of Digital Watermarks"; pending U.S. patent application Ser. No. 09/545,589, filed Apr. 7, 2000, entitled "Method and System for Digital Watermarking"; pending U.S. patent application Ser. No. 09/594,719, filed Jun. 16, 2000, entitled "Utilizing Data Reduction in Steganographic and Cryptographic Systems" (which is a continuation-in-part of International Application No. PCT/US00/06522, filed Mar. 14, 2000, which PCT application claimed priority to U.S. Provisional Application No. 60/125,990, filed Mar. 24, 1999); International Application No. PCT/US00/21189, filed Aug. 4, 2000 (which claims priority to U.S. patent application Ser. No. 60/147,134, filed Aug. 4, 1999, and to U.S. patent application Ser. No. 60/213,489, filed Jun. 23, 2000, both of which are entitled, "A Secure Personal Content Server"), U.S. patent application Ser. No. 09/657,181, filed Sep. 7, 2000, entitled "Method And Device For Monitoring And Analyzing Signals"; U.S. Provisional Patent Application No. 60/234,199, filed Sep. 20, 2000, entitled "Improved Security Based on Subliminal and Supraliminal Channels For Data Objects"; and U.S. patent application Ser. No. 09/671,739, filed Sep. 29, 2000, entitled "Method And Device For Monitoring And Analyzing Signals," and U.S. patent application Ser. No. 09/731,039 entitled "System and Method for Permitting Open Access to Data Objects and For Securing Data Within the Data Objects," filed Dec. 7, 2000. The previously identified patents and/or patent applications are hereby incorporated by reference, in their entireties.

In addition, this application hereby incorporates by reference, as if fully stated herein, the disclosures of U.S. Pat. No. 5,613,004 "Steganographic Method and Device"; U.S. Pat. No. 5,745,569 "Method for Stega-Cipher Protection of Computer Code"; U.S. Pat. No. 5,889,868 "Optimization Methods for the Insertion, Protection, and Detection of Digital Watermarks in Digitized Data"; and U.S. Pat. No. 6,078,664, entitled "Z-Transform Implementation of Digital Watermarks."

BACKGROUND OF THE INVENTION

1. Field of the Invention

This invention relates to the transfer of information between parties; in particular, it relates to systems, methods, and devices for trusted transactions.

2. Description of the Related Art

Transactions are increasingly characterized by the amount and quality of information available to market participants. Whereas a seller seeks profit driven arrangements, which may vary over the course of a relationship with a particular buyer or consumer; buyers seek satisfaction of at least one of the following: price, selection or service. At any time the buyer or seeker of value-added information may lack recognition of the seller or provider of such information, even if coupled with a "manufactured" product or good. Sellers, or providers, similarly lack any information about individual buyers, buying groups or agents, and may only have information regarding potentially profitable transaction events defined by at least one of the following: existing market for goods or services, targeted projected market for new goods or services, or those consumers or buyers who currently engage in transactions with the provider. Transactions are the result of customer profiling, a form of recognizable pattern analysis for commerce.

Transactions conducted electronically, often in an online environment taking advantage of networks, such as the Internet and/or World Wide Web ("WWW"), form an increasingly-important subset of transactions. Most obviously, retail sales transactions in which individual customers purchase goods or services from a central web server using a WWW connection have become a prominent form of electronic transactions, though such transactions are by no means the only or even necessarily the predominant category of electronic transactions.

Electronic transactions pose special challenges for transaction parties. Some of these challenges relate to the difficulty of providing to a prospective acquirer (e.g., a purchaser) of goods or services full, accurate, and verifiable information regarding the nature, value, authenticity, and other suitability-related characteristics of the product in question. This is true in part, for instance, because the customer cannot necessarily handle, sample, or evaluate at first hand the goods or services in question in an online transaction to the same extent to which he could evaluate them in an in-person transaction. It may also be true because of the fear of counterfeit, defective, or otherwise unsuitable products that may be viewed as more easily "passed off" (assuming a certain non-zero incidence of deceit and/or inadequate suitability verification among suppliers of products) in an electronic transaction than in an in-person transaction.

Further challenges in online transactions revolve around the serious concerns regarding security of such transactions. Such security-related concerns arise from the inherently-vulnerable nature of distributed public networks such as the internet, in which transaction parties cannot necessarily determine the path by which data travelling to and from them will take. Nor is it always possible to determine the identity of another transaction party, or to ensure that such other transaction party will take adequate precautions with sensitive data (for instance, data related to the identity or financial details (e.g., credit card number) of the first transaction party) transmitted during the course of proposing, evaluating, negotiating, executing, or fulfilling a transaction. Thus, concerns are raised about interception, inadequate safeguarding, or other unauthorized or inappropriate use of data generated or transmitted between transaction parties. Such concerns have raised the perceived need for security technologies adaptable for online transactions. Generically, these technologies have included encryption, scrambling, digital watermarking, and like methods of protecting transaction-related data.

Two conventional techniques for providing confidentiality and/or authentication currently in use involve reciprocal and non-reciprocal encrypting. Both systems use non-secret algorithms to provide encryption and decryption, and keys that are used by the algorithm.

In reciprocal algorithm systems, such as DES, the same key and algorithm is used to encrypt and decrypt a message. To assure confidentiality and authenticity, the key is preferably known only to the sending and receiving computers, and were traditionally provided to the systems by "secure" communication, such as courier.

In non-reciprocal systems, such as those described in U.S. Pat. No. 4,218,582, a first party to a communication generates a numerical sequence and uses that —sequence to generate non-reciprocal and different encrypting and decrypting keys. The encrypting key is then transferred to a second party in a non-secure communication. The second party uses the encrypting key (called a public key because it is no longer secure) to encrypt a message that can only be de-crypted by the decrypting key retained by the first party. The key generation algorithm is arranged such that the decrypting key cannot be derived from the public encrypting key. Similar methods are known for using non-reciprocal keys for authentication of a transmission. In the present invention, the non-secure "public" key is used to a message that has been encrypted using a secure "private" key known only to the originating party. In this method the receiving party has assurance that the origination of the message is the party who has supplied the "public" decrypting key.

SUMMARY OF THE INVENTION

Thus, a need has arisen for a system and method for enhancing trust on the part of participants in transaction. This may be with respect to all aspects of the transaction as to which trust may be an influential factor (or, viewed negatively, in which the lack of trust may be a potential bottleneck prohibiting consummation of the transaction, or of a more-optimal transaction, or of a series of transactions in a mutually-beneficial transactional relationship).

A need has also arisen for trust enhancement for transactions in connection with sophisticated security, scrambling, and encryption technology, for instance that provided by steganographic encryption, authentication, and security means.

A need has also arisen to provide these technologies in an integrated method and system, optimally requiring comparatively little processing resources so as to maximize its usefulness and minimize its cost.

The present invention represents a bridge between mathematically determinable security and analog or human measures of trust. These measures are typically perceptible or perceptual when evaluating value-added information. Additionally, a higher level of transparency between parties is assured, because information flow is recognizable and controllable by transacting parties at will.

According to one embodiment of the present invention, a method for trusted transactions is provided. The method includes the steps of (1) establishing an agreement to exchange digitally-sampled information between a first and a second party; (2) exchanging the digitally-sampled information between the first and the second party; and (3) approving the digitally-sampled. The digitally-sampled information may be approved with an approval element, for example, a predetermined key, a predetermined message, or a predetermined cipher. The step of approving the digital information may include authorizing the digital information with the approval element, verifying the digital information with the approval element, or authenticating the digital information with the approval element. The predetermined cipher may be a steganographic cipher or a cryptographic cipher.

According to another embodiment of the present invention, a method for conducting a trusted transaction between two parties that have agreed to transact is provided. The method includes the steps of (1) establishing a secure transmission channel between the two parties; (2) verifying an identity of at least one of the parties; (3) determining an amount of value-added information to be exchanged between the parties; (4) verifying the agreement to transact; and (5) transmitting the value-added information. The value-added information may include value-adding components.

According to another embodiment of the present invention, a method for conducting at least one trusted transaction between two parties is provided. The method includes the steps of (1) authenticating the parties; (2) agreeing to a security of a transmission channel; (3) exchanging secondary value-added information; (4) determining at least one term for a primary value-added information exchange; and (5) facilitating payment for the transaction based on the terms.

According to another embodiment of the present invention, a method for conducting a trusted transaction between two parties is provided. The method includes the steps of (1) establishing a steganographic cipher; (2) exchanging secondary value-added information between the parties; (3) agreeing to terms for the exchange of primary value-added information; and (4) facilitating payment for the transaction.

According to another embodiment of the present invention, a method for conducting a trusted transaction between parties is provided. The method includes the steps of (1) identifying a unique identification for each of the parties, a unique identification of the transaction, a unique identification of value-added information to be transacted, or a unique identification of a value-adding component; (2) applying a steganographic cipher; and (3) verifying an agreement to transact between the parties. Once the parties are identified by the unique identification, transaction identification, or the unique identification of the value-added information, secondary terms and conditions may be offered for acceptance. The transaction may take several additional steps and may include additional value-adding components to reach a legal agreement.

The agreement may cause a secondary term to be enabled for one of the parties. For example, the agreement may be related to the ability to choose ownership in the seller instead of some benefit in price, service or selection. This ownership may be priced according to traditional options pricing methodologies. Essentially the "discount" in cash value terms, may be the option price. So if there is a price, selection or service that can be equated to some cash equivalent amount, that amount can be used by the buyer as a right, but not obligation to purchase equity in the seller. Alternatively, the cash equivalent may have a direct equivalence in equity prices.

According to another embodiment of the present invention, a method for bi-directionally exchanging value-added information between parties is provided. The method includes the steps of (1) associating a plurality of unique identifiers with the value-added information, the value-added information including a digital watermark, a file header, a file attachment, and/or a file wrapper; (2) associating each of the parties with unique identifiers, the unique identifiers including a digital watermark, a file header, a file attachment, and/or a file wrapper; and (3) exchanging value-added information between the parties.

According to another embodiment of the present invention, a method for exchanging value-added information between parties is provided. The method includes the steps of (1) providing a data transmission means; (2) verifying the parties to the transaction; (3) negotiating a term such as a price, a service, and/or a selection; and (4) binding the term to the information using a digital watermark, a file header, metadata, and/or a file wrapper. The bound transaction terms may include value-added information.

According to another embodiment of the present invention, a method for trusted transactions is provided. The method includes the steps of (1) receiving data to be processed; (2) determining a structure of the data; (3) determining if the data is authentic; and (4) determining an associated usage of the data based on the data structure and the authenticity of the data.

According to another embodiment of the present invention, a method for secure transaction is provided. The method includes the steps of (1) receiving a request to process a transaction; (2) uniquely identifying the source of the request; (3) uniquely identifying at least one term of the request; and (4) storing identification information for transaction negotiation.

According to another embodiment of the present invention, a method for the facilitation of the exchange of information data between at least a first party and a second party is provided. The method includes the steps of (1) receiving a rule governing information data from a first party; (2) receiving a request for the information data from a second party; (3) matching the predetermined rule with the request; and (4) uniquely identifying the information data and the first and second parties. The information data may include unstructured data or structured data.

According to another embodiment of the present invention, a method for the management of rights is provided. The method includes the steps of (1) receiving information; (2) determining whether the information is structured information or unstructured information; (3) identifying the information with a steganographic cipher; (4) authenticating the information with a digital signature or a digital watermark check; and (5) associating the identification and authentication results with a predetermined record, a predetermined rule, or a predetermined function.

According to another embodiment of the present invention, a method for risk management is provided. The method includes the steps of (1) receiving information; (2) determining whether the information is structured or unstructured; (3) identifying information with a predetermined ciphered key; (4) authenticating information with a digital signature, a digital watermark check, or a predetermined ciphered key; (5) associating identification and authentication results with a predetermined rule; and (6) limiting access based on a predetermined exposure of a decision maker.

According to another embodiment of the present invention, a method for securely exchanging information data between parties is provided. The method includes the steps of (1) creating a private key; (2) deriving a corresponding public key corresponding to the information data sought and at least one of (a) verifiable data associated with different versions of the information data, (b) verifiable data associated with a transmitting device, and (c) verifiable data associated with an identity of the party seeking the information data; (3) establishing a set of one time signatures relating to the information data; (4) establishing a hierarchy of access to the set of one time signatures; (5) creating a public key signature, the public key signature being verifiable with the public key, including the hierarchy of access to the set of one time signatures; (6) providing the information to a certification authority for verification; and (7) verifying the one time signature and the hierarchy of access to enable transfer of predetermined data.

According to another embodiment of the present invention, a method for authenticating an exchange of a plurality of sets of information data between parties is provided. The method includes the steps of (1) creating a plurality of hierarchical classes based on a perceptual quality of the information data; (2) assigning each set of information data to a corresponding hierarchical class; (3) defining access to each hierarchical classes and to each set of information data based on at least one recognizable feature of the information data to be exchanged; (4) predetermining access to the sets of information data by perceptually-based quality determinations; (5) establishing at least one connection between the exchanging parties; (6) perceptually recognizing at least one of the sets of information data dependent on user provided value-added information data; and (7) enabling a trusted transaction based on verification, and associated access, governing at least one of a set of information data sets.

According to another embodiment of the present invention, a method for authenticating the exchange of perceptual information data between parties over a networked system is provided. The method includes the steps of (1) creating a plurality of hierarchical classes based on a perceptual quality of the information data; (2) assigning each set of information data to a corresponding hierarchical class; (3) defining access to each hierarchical classes and to each set of information data based on at least one recognizable feature of the information data to be exchanged; (4) perceptually recognizing at least one of the sets of information data dependent on user provided value-added information data; (5) enabling a trusted transaction of the information data based on verification of means of payment, and associated access, governing at least one copy of the information data sought; (6) associating the transaction event with the information data prior to transmission of the information data; and (7) transmitting and confirming delivery of the information data According to another embodiment of the present invention, a device for conducting a trusted transaction between parties who have agreed to transact is provided. The device includes means for uniquely identifying unique identification information, such as a unique identification of one of the parties, a unique identification of the transaction, a unique identification of value-added information to be transacted, or a unique identification of a value-adding component; a steganographic cipher; and a means for verifying an agreement to transact between the parties.

According to another embodiment of the present invention, a device for conducting a trusted transaction between parties who have agreed to transact is provided. The device includes means for uniquely identifying unique identification information such as a unique identification of one of the parties, a unique identification of the transaction, a unique identification of value-added information to be transacted, or a unique identification of a value-adding component; and means for enabling a subsequent mutually agreed to at least one term.

According to another embodiment of the present invention, a device for conducting trusted transactions between parties us provided. The device includes a steganographic cipher; a controller for receiving input data or outputting output data; and an input/output connection. The device may have a unique identification code.

According to another embodiment of the present invention, a trusted transaction device for transmitting authentic value-added information data between parties is provided. The device includes a display; a unique identifier; means for ciphering information that is input and output; means for interacting with other similarly functional devices; and means for storing or retrieving value-added information and a value-adding component.

According to another embodiment of the present invention, a device for securely exchanging information data is provided. The device includes means for creating a private key by the party seeking information; means for deriving a corresponding public key based on the predetermined data and verifiable data associated with different versions of the information, verifiable data associated with a transmitting device, or verifiable data associated with the identity of the party seeking information; means for creating a set of one-time signatures relating to the predetermined data; means for validating a predetermined hierarchy of access of the set of one-time signatures; means for creating a public key signature, verifiable with the public key, including the access hierarchy of one time signatures; means for securely transacting predetermined data by providing information relating to a proposed transaction; and means for verifying the one time signature and the hierarchy of access to enable transfer of predetermined data.

According to one embodiment of the present invention, a system for the secure exchange of predetermined, verifiable information data between parties is provided. The system includes at least one condition for the use of the information; means for differentiating between predetermined information and other seemingly identical information based on an authentication protocol; means for associating authenticity of verifiable information data with at least one condition for use; a storage unit for storing the predetermined, verifiable information; and means for communicating with the predetermined, verifiable information storage.

According to one embodiment of the present invention, a system for the exchange of information is provided. The system includes at least one sender; at least a receiver; a verifiable message; and a verification of the message by at least one of the senders and the receivers. A verification of the message may enable a decision over receiving additional related information.

According to one embodiment of the present invention, a system for computer based decision protocol is provided. The system includes a means for identifying between structured and unstructured information; a means for authenticating structured information; and a means for enabling a decision rule based on the identity and authenticity of the information.

According to one embodiment of the present invention, a system for computer-based decision protocol is provided. The system includes means for identifying between structured and unstructured information; means for identifying structured information; and means for enabling a predetermined decision rule based on the identity of the information.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE PREFERRED EMBODIMENTS

Figure 1:
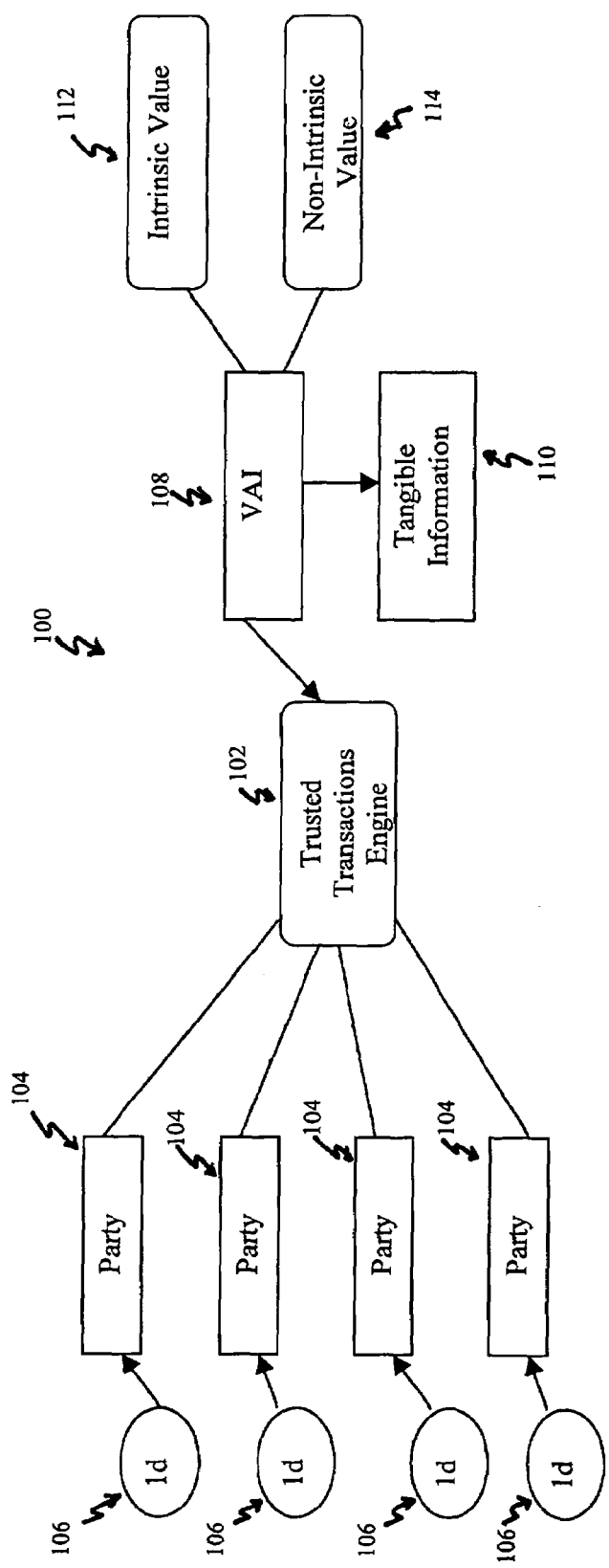
FIG. 1 is a block diagram of a system for trusted transactions according to one embodiment of the present invention.

In order to assist in the understanding of the present invention, the following definitions are provided and are intended to supplement the ordinary and customary meaning of the terms:

Authentication: A receiver of a "message" (embedded or otherwise within the value-added information) preferably is able to ascertain the origin of the message (or by effects, the origin of the carrier within which the message is stored). An intruder preferably cannot successfully represent someone else. Additional functionality, such as message authentication codes, may be incorporated (a one-way hash function with a secret key) to ensure limited verification or subsequent processing of value-added data.

Authorization: A term which is used broadly to cover the acts of conveying official sanction, permitting access or granting legal power to an entity.

Encryption: Encryption is a method of securitizing data. For example, encryption may be data scrambling using keys. For value-added or information rich data with content characteristics, encryption is typically slow or inefficient because content file sizes tend to be generally large. Encrypted data is sometimes referred to as "ciphertext."

High Quality: A transfer path into the LCS Domain that allows digital content of any quality level to pass unaltered. "High Quality" can also mean unfettered access to all VACs.

Local Content Server (LCS): A device or software application that can securely store a collection of value-added digital information, such as entertainment media. The LCS has a unique ID.

LCS Domain: A secure medium or area where digital content can be stored, with an accompanying rule system for transfer into and out of itself.

Low Quality: A transfer path into the LCS Domain that degrades the digital content to a sub-reference level. In an audio implementation, this might be defined as below CD Quality. Low Quality can also mean no VACs are allowed in to the system.

One way hash function: One-way hash functions are known in the art. A hash function is a function which converts an input into an output, which is usually a fixed-sized output. For example, a simple hash function may be a function which accepts a digital stream of bytes and returns a byte consisting of the XOR function of all of the bytes in the digital stream of input data Roughly speaking, the hash function may be used to generate a "fingerprint" for the input data. The hash function need not be chosen based on the characteristics of the input. Moreover, the output produced by the hash function (i.e., the "hash") need not be secret, because in most instances it is not computationally feasible to reconstruct the input which yielded the hash. This is especially true for a "one-way" hash function—one that can be used to generate a hash value for a given input string, but which hash cannot be used (at least, not without great effort) to create an input string that could generate the same hash value.

Read-Only Media: A mass storage device that can only be written once (e.g., CD-ROM, CD-R, DVD, DVD-R, etc.) Note: pre-recorded music, video, game software, or images, etc. are all "read only" media.

Re-writable Media: An mass storage device that can be rewritten (e.g., hard drive, CD-RW, Zip cartridge, M-O drive, etc.).

Satellite Unit: A portable medium or device that can accept secure digital content from a LCS through a physical, local connection and that can either play or make playable the digital content. The satellite unit may have other functionality as it relates to manipulating the content, such as recording. The satellite unit has a Unique ID.

Scrambling: For digitally-sampled data, scrambling refers to manipulations of the data. Value-added or information rich data may be manipulated at the inherent granularity of the file format, essentially through the use of a transfer function. The manipulations are associated with a key, which may be made cryptographically secure or broken into key pairs. The manipulation may be associated with a predetermined key, which may be made cryptographically secure or made into asymmetric key pairs. Scrambling is efficient for larger media files and can be used to provide content in less than commercially viable or referenced quality levels. Scrambling is not as secure as encryption for these applications, but provides more fitting manipulation of media rich content in the context of secured distribution. Scrambled data is also called "ciphertext" for the purposes of this invention.

Encryption generally acts on the data as a whole, whereas scrambling is applied often to a particular subset of the data concerned with the granularity of the data, for instance the file formatting. The result is that a smaller amount of data is "encoded" or "processed" versus strict encryption, where all of the data is "encoded" or "processed." By way of example, a cable TV signal can be scrambled by altering the signal which provides for horizontal and vertical tracking, which would alter only a subset of the data, but not all of the data–which is why the audio signal is often untouched. Encryption, however, generally alters the data such that no recognizable signal would be perceptually appreciated. Further, the scrambled data can be compared with the unscrambled data to yield the scrambling key. The difference with encryption is that the ciphertext is not completely random, that is, the scrambled data is still perceptible albeit in a lessened quality. Unlike watermarking, which maps a change to the data set, scrambling is a transfer function which does not alter or modify the data set.

Secure Electronic Content Distributor (SECD): An entity that can validate a transaction with a LCS, process a payment, and deliver digital content securely to a LCS. This may be referred to as a "certification authority." SECDs may have differing arrangements with consumers and providers of value-added information or other parties that may conduct transactions, such as business to business relationships. The level of trust place into an SECD can be dynamically adjusted as transactions warrant or parties agree.

Standard Quality: A transfer path into the LCS Domain that maintains the digital content at a predetermined reference level or degrades the content if it is at a higher quality level. In an audio implementation, this might be defined as Red Book CD Quality. Standard Quality may also refer to a particular set of VACs that are allowed into the system.

Unique Identification, or Unique ID: A Unique ID is created for a particular transaction and is unique to that transaction (roughly analogous to a human fingerprint). One way to generate a Unique ID is with a one-way hash function. Another way is by incorporating the hash result with a message into a signing algorithm will create a signature scheme. For example, the hash result may be concatenated to the digitized, value-added information which is the subject of a transaction. Additional uniqueness may be observed in a hardware device so as to differentiate that device, which may be used in a plurality of transactions, from other similar devices.

Value-Adding Component (VAC): An attachment to the content that enhances the user's experience of the content. VACs may be metadata, headers, usage rules, etc. For music, some examples are: album art, lyrics, promotional material, specialized playback instructions. For other embodiments, the value-adding component may relate to the consumer's personal information, preferences, payment options, membership, or expectations over a transaction.

The agglomeration of value-adding components is "value-added information." In the aggregate, value creation on an informational level can be observed and measured.

Value-added Information: Value-added information is generally differentiated from non-commoditized information in terms of its marketability or demand, which can vary, obviously, from each market that is created for the information. By way of example, information in the abstract has no value until a market is created for the information (i.e., the information becomes a commodity). The same information can be packaged in many different forms, each of which may have different values. Because information is easily digitized, one way to package the "same" information differently is by different levels of fidelity and discreteness. Value is typically bounded by context and consideration.

Verification: Called "integrity," in cryptography, an intruder preferably cannot substitute false messages for legitimate ones; the receiver of the message (embedded or otherwise within the value-added information) preferably is assured that the message (or by effects, the origin of the carrier within which the message is stored) that the message was not modified or altered in transit.

Note: The above definitions may be interchanged in different embodiments of the present invention and serve as parameters in breaking down value-added information exchange and trusted transactions.

Embodiments of the present invention and their technical advantages may be better understood by referring to FIGS. 1 through 13, like numerals referring to like and corresponding parts of the various drawings.

Increasingly, a premium is being placed on both recognition and trust. These intangible elements are both expensive to create and to maintain given the ever-decreasing amount of human contact during transactions. To the extent that many transactions are now possible without any human contact, the present invention is a unique improvement over the art in enabling bi-directional authentication of information between parties to enable "trusted transactions" between those parties.

For anonymous market exchanges, transparency and data integrity, as well as confidence, serve to promote confidence and growth in product, goods and service offerings. Perception is an expensive trigger to trusted transactions reinforced by the experience of market participants.

Confidence as well as experience enable trust: in an anonymous marketplace, it is desirable for the authenticity of value-added information and value-added components to be made more transparent and independently verifiable by all concerned parties. Transparency is valued in education and experience.

A purchase decision between a buyer and a seller is equivalent to the temporal establishment of a mutually agreed "abstraction of value" in the information sought or exchanged, which may be represented in both tangible and intangible forms. Perception is the natural limit of "fair pricing," and drives value determination of a particular good or service. Perception may be structured by context, history, and/or condition. The "value" of a particular transaction has an intrinsic meaning (financial, economic, legal, political, social, statistical or actuarial meaning), temporally (at the instant of the transaction), for both the buyer and seller (reached an agreement including offer acceptance and consideration), with any inclusive terms and conditions (hereinafter, "terms") governing the transaction (price, credit terms, delivery options, and other parameters concerning the good or service with respect to which the transaction takes place). As a result of such trusted transactions, the parties gain confidence. Even parties who may be anonymous benefit from the contemplated improvements over the art.

Referring to FIG. 1, a block diagram of a system for trusted transactions is provided. System 100 includes trusted transaction engine 102, which interacts with a plurality of parties 104. Each party 104 has a unique identity 106.

Value-added information 108, as defined above, includes both intrinsic value 112 and nonintrinsic value 114. A vendor (who may be a party 104) may decide what information has value (i.e., should be considered to have intrinsic value or not), and this decision may be made on a per transaction basis.

The present invention may provide advantages to all parties involved, including pricing flexibility, a reduction (or optimization) of transaction costs, a recognition of value-adding components, and the ability to provide provable security and trust among parties. Each will be discussed in greater detail, below.

1. Pricing Flexibility for Parties

Because buyers and sellers have complementary but competitive goals in consummating a transaction, variable pricing in the present invention is supported without any detrimental affect on the potential relationship between the buyer and the seller, or their agents. Known systems depend primarily on securing payment; payment alone, however, does not ensure the buyer and the seller of lasting protection of their respective "intangible assets," especially those that are increasingly based on value-adding information (e.g., trademarks, copyright, patents, credit history, health condition, etc.). The buyer fears identity theft ("first party," or "sentimental" piracy), while the seller fears piracy of valuable information assets ("third party," or "positional" piracy). The separation of authentication of perceptually-represented goods and services and value-adding information, from payment security, is an important novel feature of the present invention.

Known systems specify a number of methods for ensuring "security." However, the primary feature of these approaches is access control based solely on proof that a purchase has been completed. This means that if a purchase can be enabled only by determinations that a transaction was successful, the ability to entice more transactions or otherwise increase the development of maintainable trusted transactions is undermined. Simply, the fact that a purchase was completed does not mean that a trusted transaction has, in fact, been enabled. No provision for establishing a trusted relationship between the buyer and the seller takes place absent some authenticable exchange of additional value-adding information. The present invention increases the likelihood of a successful trusted transaction and extends beyond the ability to pay (assuming no "identity theft" has occurred). The present invention provides additional means for verifiable information exchange that enhance the experience of the buyer and the seller in seeking trusted transactions.

Because many manufactured goods are likely to have similar costs from a strict manufacturing standpoint, the value-added service, or services, that are provided to the buyer are likely to encourage additional opportunities for trusted transaction. The seller can benefit by leveraging a single purchase into a profitable relationship. Even distribution costs may be commoditized for all similar tangible goods. A series of non-contiguous or non-temporal transactions alone would constitute a profitable relationship if the buyer is satisfied and the seller is profiting. That pricing, and its terms, may be varied dynamically or supported flexibly (based on information exchange at the time or leading to a transaction), is another improvement over the art. The incorporation of micropayments becomes more feasible as the cost of trust has been reduced and thus smaller discrete increments of monetary consideration are easier to support to the benefit of buyers and sellers seeking higher granularity or discreteness over the information or tangible goods they transact. Simply put, identification and authentication of specific information and value-added components is inherently important to further segmentation of units of payment (e.g., micropayments). Micropayments may be interpreted as a value-added component in facilitating transactions.

Pricing may also be bi-directional and asymmetric, and is preferably determined by the seller in order to define "profitability." Some sellers may choose to maintain fixed pricing for their goods or services, but may incorporate variable pricing in the value-added component. For instance, while the price of a given good or service may be fixed, the value-added component may be the terms of the pricing as it effects the buyer. The seller may also entice the buyer to provide demographic value-added components, or related data, which has intrinsic, sentimental value to the buyer. To the seller, the pattern, or structure, of demographic datum serves as a valuable filter in which to position its offerings. Simply put, while barter is relatively inefficient, cash, being anonymous, may not reveal enough information to provide an incentive for the seller to vary credit terms or offer a greater variety of goods and services, even if there is a single underlying value-added information good (the seller can still offer perceptually similar but nonequivalent versions of the information without threatening secure, higher quality, limited, or more expensive versions).

The ability to offer both secure and unsecure, or legacy, versions of the same information based on a mutual disclosure and mutual understanding of both the buyer and the seller is particularly novel in the art. Moreover, privacy can be enhanced and new, unproven and yet unsecure information can be offered without jeopardizing the security of any pre-existing primary value-added information whether it be music, images, currency, electronic documents, chip designs, source code, legacy versions, prior art, etc.

The period of payment, like the discreteness of the actual payment, interest rate relating to a payment period, grace periods, early payment benefits, variable interest rate based on the seller's ability to assess the credit risk/worthiness of the buyer or its agent, etc. is an element or component (a value-added component) that may be changed to affect a transaction. Making these components more transparent to buyers improves the opportunity for enhancing and maintaining trust. It also enables buyers and sellers to make mutually beneficial decisions based on transparent, verifiable information or value-added components. Moreover, buyer-driven pricing, as with Dutch auctions, or market-based pricing, are not possible without compromising the access-based security in known systems. With the present invention, goods and services are better able to realize fall market value because access to the good or service is not restricted (such as with new music or new endeavors by "unknown" or "unrecognized" artists, designers, creators or engineers). The market participants are better able to assess the good or service in question, and/or the related value-adding information/component, when experience and information sharing is encouraged. The prior art is restrictive by necessity in information sharing precisely because security cannot be maintained by prior art systems with such open access to information.

For goods or services that are difficult to value (e.g., media content, legal advice, design, non-commodity items, etc.) and decision-intensive, pricing becomes a barrier to entry in a marketplace that puts a premium on recognition. Highly recognized artists, lawyers, designers, retailers, etc. have a competitive advantage over their unrecognized competitors. One approach to gaining recognition is freely distributing or providing goods or services. Ultimately, the seller still needs to profit from this initial positioning to the extent that financing of operations is available (the seller can stay in business as long as investors or financing is available to enable such operations). The same goods or services may be offered in a "tiered" manner, which relates to the purchase price or to the quality of the underlying good or service to be exchanged. Examples of this include providing music in MP3 quality audio instead of CD quality; providing 10 hours of customer support instead of charging per hour; charging service charges instead of free checking or ATM access; charging a price per bit or bandwidth; etc.

Segmenting also plays a role in the "freshness" or "newness" of the information good or service. Live concerts or lectures may be worth more to the buyer than pre-recorded versions offered later or separately. The performer or creator of the information to be performed, or conveyed live, can only be at one place at a time, and may be a premium for that time. Live broadcasts may similarly have a higher value. Physical advice may be worth more than printed literature to the buyer as well. These dynamics create an impetus for flexible and dynamic pricing that does not undercut the security of the overall "trusted transaction" methods and systems envisioned in the present invention.

In known systems, legacy information, relationships, etc. systemically undermine the ability to ensure a "trusted system." The buyer and the seller in the art have no means for differentiating between the secure and unsecure versions of a good, service, or value-adding component. The present invention provides such protocols by incorporating additional bits of data, which do not necessarily represent added data, but imperceptibly replace data with identifying or authenticating data, enabling market participants to determine whether a value-added information "package" is secure. This also enables uniqueness of information packages to be consistently created and checked or maintained for later reference. The prior art relies on the denial of access or access restriction, a clear disadvantage in increasing the availability of value-added information. With trusted transactions market participants are able to verify, identify, and price information and then decide which versions are appropriate for a given or existing demand.

Pricing may be better understood if the cost or time of computation is measured as a tangible asset. Similarly, the natural limit to theft of tangible assets has always been in the cost of the tangible assets. As information can increasingly be traded for value in excess of the cost of its storage or transmission, pricing becomes less tangible and more subjective. Delivery of information accurately and quickly becomes a valued service. Measuring such value is based on the same principles that allow cost estimates of the delivery of fixed weight parcel packages. The existence of hackers indicates a lowered economic barrier to entry for informational crime, including identity theft and piracy. Dissemination of binary code, which is similarly detrimental, at little or no cost to the originator of the valuable information, introduces novel concepts to the approaches of information pricing. Tangible goods become substitutes for cash payment.

An example of pricing based on effort is illustrated by a watchmaker who takes six months to finish a watch that he prices at $70,000. This includes a "reasonable" profit and the cost of materials. The buyer is a watch fanatic and earns $140,000 a year. The exchange of a tangible good that has intrinsic value, which is converted into monetary terms for negotiation, as agreed by the parties in the exchange, becomes more prominent if information concerning value is transparent or fluid for all market participants. Transparency is inherently favored by markets seeking to appropriately price goods or services based on all available information at the moment of pricing. Conversely, risk can be priced based on the financial context or structure of an organization. Those who earn $20,000 should have to have confirmation by others with additional financial or fiduciary responsibilities before validating or approving transactions that exceed an individual's earnings for the period in question. At any time responsibility can be linked to authority, as a pricing mechanism for decisions concerning similar amounts of monetary consideration. With pricing mechanisms and use rules, trusted transactions offer flexible pricing not possible with current systems.

Value-adding components, which may include pricing, is preferably viewed as a separate and distinct means for the buyer and the seller to separate information that may or may not be essential to any given transaction and may also be viewed as nonessential unless both parties can stipulate such information exchange. This is invaluable as multiple channel distribution of the "same" goods (e.g., download music over the Internet versus purchasing a CD from a store) or services (obtaining a mortgage online versus processing physical loan documents) can be offered by the seller. Determinations of which channel, or channels, are profitable requires verification of unsecure and secure versions of these "same" goods.

Value-adding components may also include an offer, an acceptance, a bid, a purchase, and a sale of a securities instrument, including an option, a warrant, or equity.

Security is inherently intended for the party seeking value or authentication over the information or transaction and conversely protecting sentimental information or identity from being stolen or defrauded. For the long term, buyers are able to differentiate that personal information value-added components are appropriate for dissemination to a seller to affect a transaction, or to get better terms. Either the buyer or the seller, or both, are better able to determine that transactions or relationships are favorable on a transaction to transaction basis, and thus "transact" accordingly.

Pricing of the value-added information may include a value-adding component relating to the present value of recognition/non-cash equivalent cost/service that is handled in a separate negotiation or transaction, or a subsequent negotiation or transaction.

The present invention may include limits of liability, or may consider the time value of money when determining a limit of liability threshold. The present invention may enable rules/access/authorization based on the result of that operation. In one embodiment, an actuarial estimate of liability (future time) or cost (present time) may serve as a rule for enabling another rule.

2. Reduction or optimization of transaction costs

In instances where the buyer and the seller, or their agents, seek to transact products or services that include value-added information, the seller generally seeks to maximize profit, but may forego profit in the short term to ensure recognition or market share in the short term. The buyer seeks "satisfaction," which is dependent on one or more of the following product/service determinants: 1) price; 2) service; and 3) selection. These determinants may be quantitatively or qualitatively assessed and may be based on available bandwidth, time of transaction, and transaction event conditions.

A priori, the buyer may not recognize the seller. In an information economy, such events are not a disincentive to pursuing a trusted transaction, but instead present market opportunities for valuing, authenticating, and verifying information (all may be value-added components) concerning potential transactions are inefficient. Conversely, the seller may not have enough information about the buyer to determine what type of potential transaction can be enabled, based on the buyer's ability to purchase now, or at any point in the future. The seller may be inclined to make a sale with the buyer (or the buyer's agents) with or without confidence that the initial transaction will lead to further transactions or trusted relationships that are profitable for the seller. The seller may use purchasing options (e.g., barter, cash or its equivalent, or credit) to enable a purchase by the buyer. According to one embodiment of the present invention, because value-adding information and its components may be bi-directional, both the buyer and the seller may chose to negotiate the transaction, including variable terms for payment, as one form of value-added component or service and support for the information to be transacted.

Transactions, as defined by a purchase event (payment can be preliminarily assured), may happen before or after the buyer and the seller have "agreed" to transact. When the seller requires value-adding components/information about the buyer before entering the transaction, the seller generally has higher risks than the buyer, which may affect its profitability. Where there is a high risk for piracy, such as the digital copy problem (that can render individual copies of value-added information worthless), the seller may not be able to establish trust with an unknown buyer. The seller is not assured of any potential profitable transactions or long-term relationship with the buyer, which poses a significant risk to the seller if the buyer pirates information goods or services. A lack of dynamic authentication, even in real time, at least initially, and adjusted as needs arise over time, and flexibility in negotiable terms, may cause the seller's assets to be economically undervalued.

Conversely, in those events where the buyer requires value-adding components/information about the seller in advance of entering a transaction, the buyer generally has higher risks than the seller with regard to its ability to enter into transactions. "Identity theft" is an example of a risk that is higher for the buyer than the seller in these types of transactions. Additional transactions include on-line brokering, auctions, searches, bots, webcrawlers, recognition, and determination of goods or services absent proof of privacy guarantees. This applies to noncommercial information as well (e.g. the FDIC logo, currency, driver's license, etc.)

The establishment of mutual trust may be asymmetric depending on the risk profile of the buyer and the seller. Risk/reward tradeoffs are implicit to some transactions, while the time required to establish a trusted transaction or eventual profitable relationship may not be contiguous. In many on-line transactions, the per transaction risk is generally higher to the buyer, who may suffer fraud and may need to be more diligent about what value-adding information it chooses to exchange in the interests of enabling a trusted transaction. It is true, however, that in business to business transactions ("B2B"), or in financial information exchange, the relative risks to each party are relatively equivalent, and requiring a more symmetric exchange of value-adding components relating to verification and purchasing power (in the form of barter, cash, cash equivalents or financing that would also constitute value-adding components) is not as necessary. Reducing the cost of creating and maintaining trust is an advantage of the present invention over known systems.

3. "Reintermediation": Recognition as a Value-added Component

Asymmetry exists in recognition as well. Where word-of-mouth may constitute an acceptable means for creating recognition for a particular good or service, the buyer and the seller may wish to expand their respective abilities to capture more of the increasingly available goods and services, or value-adding information (about themselves, or terms for a trusted transaction). With advertising and other forms of marketing, the push and pull of value-adding information between the buyer and the seller also contributes to potential purchase decisions by both parties or their agents. The buyer may control certain criteria it seeks, such as price, selection, and/or service. The seller, conversely, seeks the highest profits from a given potential buyer or his agents, which may not be quantifiable from the first transaction or may not be the primary focus of the seller (such as seeking a valuable, marquis client). Both the buyer and seller may compare patterns or structure that, when recognized, help in forming opinions about the history, condition or context of the information.

In general, recognition serves to encourage more recognition. The seller will likely seek trusted transactions in the interests of profitably leveraging the time, cost and expense of generating the initial exchange of goods and services with the buyer. Over the longer term (defined as any additional transactions beyond the initial transaction), a profitable relationship is sought by the seller. The buyer and the seller may still maintain flexibility as expectations or needs concerning the relationship change. The present invention allows for such variability and flexibility by enabling real time adjustments to the terms that prevail between market participants. While terms are conditions are negotiatiable, security of the overall system is not jeopardized because secure and unsecure versions of the "same" value-added information and value-added components can be adjusted bi-directionally. In an information-based transaction, there is value in reintermediation by sellers seeking to ensure that their information is provably identifiable and verifiable.

The buyer and the seller may seek recognition or use means for increasing visibility of their respective interests. The buyer ultimately seeks to satisfy itself through a trusted transaction preserving private or financial information for select transactions requiring higher amounts of information exchange or verification (real time references, "membership reward programs" such as frequent flier airline points, or financing options that can be dynamically offered, are two incentives to the buyer and are likely to differentiate vendors, large and small, really or perceptually); the seller ultimately seeks to profit from the trusted transaction. Recognition of this potential exchange between the parties is not assumed to be high enough to enable a transaction, but high enough to create exposure for the buyer or the seller. Trust is assumed to not be pre-existing, or it may be variable between the buyer and/or the seller, requiring additional exchanges of value-adding information to enable a trusted transaction. The seller, in the extreme, seeks the highest profit for each transaction. The buyer, in the extreme, seeks the highest satisfaction for each transaction. As discussed above, both goals are complementary and competitive, thereby increasing the need for dynamic exchange of value-adding information. Recognition can enhance the potential for a successful trusted transactions and serves as a form of abstract experience for both parties to efficiently make decisions. With experience, value assessments become possible. Abstractions of value become experience as trusted transactions beget more trusted transactions.

4. Provable Security and Trust

Trusted transactions are characterized primarily by bridging the gap between "provable security" and the imprecise nature of trust. Encryption, cryptographic containers, digital watermarks and other forms of electronic data security can be mathematically demonstrated—discrete algorithms can be designed to meet certain pre-defined specifications or pre-defined expectations.

Encryption and secure digital watermarking (e.g., steganographic ciphering) offer tools for determining data integrity, authenticity and confidence. Transactions, however, still require human decision-making. Known systems describe a number of approaches for ensuring transactional security based solely on transmission security and fail to differentiate between what could be called "positional piracy" (e.g., the fraud or theft of universally recognized goods, products, and services) and "sentimental piracy" (e.g., the fraud or theft of personal, private or financial information).

For the purposes of this disclosure, the extreme case of sentimental piracy is identity theft. So long as information can be represented in binary digits (0s and 1s), and can be easily copied, stored or transferred, identity fraud becomes an increasingly insidious problem. There is a temporal limit whereby the actual person is able to "reclaim" their identity at some point in time. The extreme case of positional piracy is zero returns on an intangible asset that has been pirated. As well, the present invention offers advantages over known systems for positional piracy that enable the continuation of legacy business, customer relations and existing information formats, without sufficiently weakening any overall system security for trusted transactions. Simply, unlike known systems, access restriction is not an adequate or appropriate means for ensuring the security of information data for a wide variety of applications.

To the extent that "security by obscurity" is typically representative of weak security to those skilled in the art of cryptography, more transparency for parties to a transaction over security protocols and information transfer are inherently necessary to ensure trusted transactions. Although information between parties may be asymmetrically exchanged (i.e., the value-added information or value-adding components is not equivalent in quality or quantity between parties, such as a difference in the amount of information exchanged, the identification of the parties, etc.), the level and degree of authenticity or verification only differs among the goods, products or services to be transacted, as well as the demands of the market participants. For the purposes of this disclosure, the value-added information is the fundamental good to be transacted between parties, while value-added components represent an atomic unit of data that is defined as the least amount of data that can either add functionality or be perceptibly recognized to a system for trusted transactions. Data may be represented in analog or binary terms in order to establish uniqueness and assist in identification and authentication. Value-added components may be added, subtracted, or changed to vary the underlying value-added information sought.

Because humans have difficulty remembering passwords, personal identification numbers (PINs), and the like, dependence on such datum is increasingly problematic as more anonymous transactions are enabled between parties over electronic networks, such as the Internet, or between businesses in private networks. While passwords, or PINs, are commonly thought to be secure, the ability to check all combinations of numbers or crack passwords becomes less computationally expensive with increases in both processing speed and availability of bandwidth. Cost is reduced to the detriment of security if any individual has the means for high order computation or network-based bandwidth in discovering or hacking any given secret. Quantum computing speeds up the ability to test and discover such data at even greater speeds, and presents unique problems to security systems described in the art. Quantum computing also enables the definition or predetermination of the physical limitations of communicating or securing information. Where difference between binary or digital signal processing and quantum mechanical limits is higher, better security is enabled.

Biometrics have been suggested to remedy this problem, but do not offer any way to create truly cryptographic secrets to be shared between parties. Iris scans, fingerprints, and the like, are easily stolen because they are easily perceptible to those seeking to defraud. Once stored electronically, biometrics be stolen for unauthorized use. Combining a biometric with a digital signature may provide a means to ensure that a given representation of a fingerprint or iris is fixed, temporally at the time the certificate is created, but does not prevent dedicated attacks at determining the fingerprint or iris to be used at some subsequent time. Real time authentication and verification are improvements envisioned with the present invention. Assuring that a particular fingerprint, signature or iris "data set" is that of the intended user, is fundamentally important to embodiments described herein. This becomes especially invaluable with increasing number of anonymous transactions. Although uniqueness may be enhanced with digital signatures and digital iris or fingerprint records, the advantage with the present invention is that more secure forms of uniqueness based on a predetermination of the discreteness of time and a predetermination of the limits of information conversion and transfer are absent in the art.

Moreover, real time authentication is not enhanced with systems described in the art, since such biometric data is easily stored or transferred, and thus suffers the same pitfalls for any binary data that is sought by a party seeking to defraud. Biometrics may be great for forensics (e.g., to determine after the fact who is responsible for a particular act), but they do not effectively address an inherent problem in enabling trusted transactions; that is, real time verification of parties or real time association of parties with information being transacted (in an auction, for instance). They are also not representative of a cryptographic key, which, as is well-known in the art, requires secrecy, randomness, and an ability to update or destroy the cryptographic key.

Another advantage of the present invention is the ability to serialize or individualize "personal secrets" that are shared between parties to boost confidence and transparency of transactions. That control, and the inherent uniqueness of personal entropy, constructed from such information as a hometown, favorite restaurant, or high school sweetheart, is a means for perceptible representations of "secret data" that enhances the ease-of-use and application of appropriate shared secrets to be exchanged in conducting trusted transactions. Associating such secrets with primary value-added information or value-added components being transacted is an additional novel feature of the present invention. Essentially, the present invention provides the ability to personalize or serialize, informationally, an actual "transaction event," including: the buyer; the seller; primary information; value-added components and tangible assets created, manufactured, or manipulated; and any additional reference that can be made perceptible and secure to any observer. Bridging cryptographic with real world perception is a benefit over the prior art.

Essentially, randomness alone, whether pre-determined or not, is not sufficient for the creation of a "secret" that may be used with high levels of confidence repeatedly in assuring the validity of information or verify the identity of a party. Encryption systems cipher the randomness according to available data capacity; digital watermarking ciphers the randomness according to perceptible features or characteristics of the carrier signal (a humanly-perceptible measure of data capacity, which distinguishes applications for encryption from secure watermarking). That such information can be made more computationally difficult to discover, even by brute force attacks (since such experience is only limited by the experience of individuals) is of particular benefit to the art. The computational complexity added by use of a steganographic cipher is discussed in the U.S. Pat. No. 5,613,004, the disclosure of which is incorporated by reference in its entirety, and offers a means for human observers to see the actual tampering of information represented perceptibly. This proof is self-similar to that which is obvious in the real world, i.e., the ease at which one can observe that a watermark is missing from currency. Handling information as contemplated by the present invention for trusted transactions is unique in bridging computational benefits from both digital signal processing and cryptography to the benefits of all parties to a transaction. The present invention is the enhancement of transactions through bi-directional verification of parties and verification of primary or secondary information exchanged.

An additional advantage of the present invention is the ability to continue to offer legacy business relationships, legacy products, legacy services and other means that will not reduce the overall security maintained by a system for trusted transactions. Known applications lack this feature, and instead rely on denial of access or authorized access to information. Information need not be restricted, and is preferably freely exchanged to widen the opportunities for transactions with a greater potential number of parties. The present invention is an improvement, in that the elements necessary for generating trusted transactions may be made more flexible, and those elements that are "secret," those elements that will be available at predetermined times, as well as those elements that are made more obscure to unintended parties, increase the overall computational difficulties in defeating a system for trusted transactions.

An additional consequence is improvements in enterprise resource planning and data mining. To the extent that transactions are made unique and may be atomized into data, functions, value-added components and any associated information, the cost of maintaining or referencing stored data, a goal in data mining technologies, can be made more efficient and effective in assisting with an optimized appropriation of resources, individual or corporate. Without such uniqueness, serialization, authentication, verification or identification, particular transaction events cannot be analyzed, manipulated or optimally used to create additional trusted transaction opportunities. Caching technologies are similarly effected by the present invention. The choice about what information should be maintained locally based on identification or authentication of that information available on a network, such as the World Wide Web, enables higher efficiency in sorting and referencing data for repeated use without increased demands on the network.

The ability to serialize individual transactions by particularizing trusted transaction elements between parties is handled more consistently than in known systems. Access is not denied, and rules for access are not pre-determined for goods or services that require exposure, testing or additional information for consummating a transaction. Ease-of-use, maintenance of more human-like and physical world expectations of trust are made more transparent. Identity and authentication risk is reduced, and confidence is increased. Overall expectations are handled according to the needs of individual parties to any number of transactions. What results from trusted transactions is a more vibrant and competitive marketplace for information, value-added or not. Anonymity and legacy relationships may be maintained, unlike requirements in known systems.

The application of steganographic ciphers enables an "optimized envelope" for securely inserting, detecting, and protecting informational signals, or data, or digital watermarks (predetermined messages) in a given digitized sample stream (e.g., a predetermined carrier signal, such as audio, video, image, multimedia, virtual reality, etc.). As the perceptible qualities of the content stream have a basis as analog waveforms, steganographic ciphering increases the computational difficulty of crypto-analysis and makes unauthorized removal or tampering of the watermark a costly operation. With perceptible damage to a carrier signal a result of such tampering, tampering is more easily observable by parties, including those who are involved in a particular transaction event. Moreover, such tampering enables higher transparency and verification of carrier signals of datum that are marked for secure exchange, even if over unsecure transmission channels. The prior art relies overly on secure transmission channels while ignoring the potential benefits of securing datum (with secure watermarking, scrambling, or chaffing, for instance) over any available transmission channel. Such tampering is also transparent to vendors handling or accepting the information that enables less costly validation of claims made after some event must be confirmed and verified to the satisfaction of transacting parties. These unique features are an improvement over the art.

What differentiates the "digital marketplace" from the physical marketplace is the absence of any scheme that establishes rights and responsibility, or trust, in the authenticity of digitized goods, services or value-added information. For physical products, corporations and governments watermark "goods" and monitor manufacturing capacity and sales to estimate loss from piracy. Reinforcement mechanisms, including legal, electronic, and informational campaigns also exist to better educate consumers. Evidentiary levels of confidence must exist to support claims that are typically competitive between parties to a transaction.

Currently, security parameters may be coded into the actual physical transaction system or instrument. Similar to the security inherent in the randomness of the magnetic strip on most credit cards, these security parameters are designed to be tamper-resistant. Cracking such codes would not present insurmountable barriers to a dedicated effort at cracking a PIN. Access authorization is easily compromised by fraudulent reconstruction of an instrument, such as a credit card. Although storage of the security parameters in volatile, or nonpermanent, memory appears to offer advantages, including higher security required for many transactions, absent this higher level of security, real time authentication becomes a crucial benefit to parties in ensuring the validity of many forms of transactions. Insurance, identity, and purchases of expensive items or services are not generally confidently handled. Use of trusted transactions to process value-added information is unique and beneficial.

Several components may be used for separation of "trusted elements" for a given device or method for ensuring "trust" according to one embodiment of the present invention. First, a general purpose computing device is comprised of a CPU, a memory or storage, input and output devices, and a power supply. A device or card holder decides whether and when to use the device. For additional benefits described herein, personal information or privacy data may be controlled by the user in sample embodiments envisioned, unlike other pre-determinations of data in non-trusted transaction smart cards (e.g., a credit card).

A data owner, who may or may not be the device holder, is provided. Where the device holder and data owner are the same, as contemplated by some embodiments of the present invention, such data as digital certificates, time stamps, Unique IDs of data coming into and out of the device (personal or financial information being a large class of such data), etc. can be authenticated in a humanly-perceptible manner. This may be accomplished by a transducer, or a screen, that can transfer analog-based information of device holder, or be inputted and transmitted by the device holder for secure watermarking, or hashing of data to be exchanged.

A terminal, controlling input and output to and from the device (e.g., phone cards are controlled by the phone service provider's terminals, ATMs are controlled by financial institutions, set-top boxes controlled or owned by entertainment distribution providers, etc. that may be made physically secure by separate means) or a system that may interact with a device, such as that contemplated in embodiments herein, to enable real time authentication or verification where such checks may fail from time-to-time with existing pre-defined trust arrangements or pre-determined protocols that require inefficient updating by one or both parties. In lieu of a physical visit to a vendor, the present invention anticipates more convenient anonymous updates, in those markets where it is possible to the benefit of both buyers and seller—both parties have a market demand or need and are able to agree to such arrangements.

Embodiments of the present invention may include a simple Internet browser plug-in, with complementary system software for the provider of "information goods or services," that would identity, verify, authenticate, enable transfer, enable copying or other manipulations of the various primary value-added information and value-added components. Some of the functionality may strictly indicate what, if any, security exists within a particular primary value-added information set. This need not be settled within a system of trust, but be inherently imperceptible to any casual observer or market participant interested in the information or the transaction events that can be observed. Essentially, encouragement of provable differentiation between different classes of primary value-added information (secure, unsecure, legacy, etc.), value-added components (not the primary information but value-adding to the transaction event, and any information concerning market participants (private, history, condition, or financial) is enabled, using simple steganographic ciphers with mapping and transfer functions without compromising the underlying security.

A device issuer controls the operation of the device according to mutually agreed to terms between parties. The device issuer may limit the use or functionality of the device.

For the device hardware manufacturer, fraud may be attempted by the various parties, subcontractors, etc, who are involved in the manufacture of the devices. The device issuer requires protocols that cannot be defeated by typical "rogue engineer" attacks, where security is dependent on an understanding of the methodologies, device, or system design. In fact, the ability to transparently and provably manufacture secure smart devices may be accomplished with such protocols as digital time stamping (using successive temporally related hashes that seed other hashes to create a universally acceptable means for establishing the time of manufacturer, with time being the universal constant), or digital watermarking (where instead of time, other predetermined data is concatenated with data for provably establishing ownership, over the device). Tampering must be provably perceptibly evident upon tamper detection of the device (as with device used for limiting theft of clothing or physical items in retail stores). Prevention of the rogue engineer problem is not anticipated by known systems.

A software manufacturer usually requires clear specifications or transparency such as open source code, providing the underlying ciphering algorithms and other specifications for analysis. Similar trust issues as with device hardware manufacturing exist. Stega-ciphering the operating system, the simple system or engine for determining authenticity and identification of available data, to prevent memory capture, cloning, write once memory specific to the device holder provide additional benefits of security. A discussion of such is provided in U.S. Pat. No. 5,745,569, the disclosure of which is incorporated by reference in its entirety. As well, using transfer functions with associated predetermined keys is also a means for accomplishing confidence and authenticity in transaction. This is described in U.S. patent application Ser. No. 09/046,627, entitled "Method for Combining Transfer Functions with Predetermined Key Creation," the disclosure of which is incorporated by reference in its entirety.

In general, security requires: fewer splits of trust (poor tying arrangements that may encourage fraud or piracy), better transparency of data (it should be perceptibly apparent, or mathematically, or actuarially possible to observe risks and quantify them to enable security design with a clear understanding of potential threats for each system, method or device), and use of cryptographically strong protocols, where security is both provable and perceptible such that market-driven features are both fundamental at the earliest development and design of appropriate systems and devices, in order to build confidence and trust that is acceptable and transparent to all parties to a transaction.

Application of a steganographic cipher to the operating system or operation of the contemplated systems and devices ensures further security from tampering. Such methods are disclosed in U.S. Pat. No. 5,745,569, and offer additional benefits when coupled with the embodiments disclosed herein. System or device operations may be controlled with minimum functionality, objects or executable code. As value-added information is checked for authenticity, decoding any embedded operation objects or code, executing the operation of the system, and deleting the object or code from memory, or randomizing it in memory to avoid capture, would greatly increase the security of both value-added information and the systems or devices intended for manipulation of the value-added information. Alternatively, certain base functions, such as play, record, copy, manipulate, and transfer data, may be problematic. These functions may be atomized into objects that must be first authenticated by the trusted transaction device before they are operable for the given format, or before they provide additional information.

Time of use has traditionally been a typical constraint for securing smart cards and similar devices, but may become ineffective and inconvenient to users. Enabling a smart card to capture or transduce information (even converting analog information or input into secure digitally-sampled representations of the analog information for analysis and authorization, as with a stega-ciphered digital watermark) about the time, location, identity or any number of specific datum greatly enhances smart card and similar device security, trust and confidence. Such benefits over known systems are valuable contemplated with the present invention.

Valuations of trust also enables the described sample embodiment of a trusted transaction system or device to compare private information with financial information, essentially bridging determinations of risk in financial transactions and insurability. Private, or sentimental, information disclosure is more highly sought in determining insurance risk. The ability to pay, and other financial information, are being commoditized. Insofar as the described method and device for such deployment of trusted transaction technology can be assessed for different products and markets, the example of an insurance device could easily be called a trusted transaction privacy/financial information device or card. Users can control what information they disclose given the risk coverage or credit they seek, and providers being able to decide, with more current and transparent information disclosure possible, what to underwrite or what to finance.

For the authentication or identification device, there is a risk of identity theft to both buyers and sellers, or information that is limited by law. Examples include Medicare-covered drugs, local legal constraints, etc. Risk may be predetermined or limited by a government agency (FDIC, FBI, Social Security, IRS, DMV, Federal Reserve, etc.), a similarly outfitted organization (trust is held in perceived and observable representations of the organization, food stamps, stamps), or an equivalent transaction event enabler (traveler's check provider, medication, etc.). In these cases, systemic risk is limited by enforcement agencies held in trust by a government or body politic. The restrictions are predetermined and dependent on successful authentication or identification of a product, label, or other similar item. Laws may differ between localities and may be dependent on some form of identification, proof of age, or proof of residency. To properly serve local residents becomes a data security issue. This embodiment offers advantages over the art in its flexibility and real time, perceptible authentication properties.

Both the provider and the agency involved may have higher levels of risk, because the nature of the information is characterized by high value, general or universal recognizability, and a genuine threat of fraud. Most people casually accept that $10 and $20 bills are real even if they prove not to be later. Governments try to limit such liability without damaging the overall trust in the currency. As abstractions of value are exchanged, a smart identifying device, instead of value replacement device (predetermined, fixed spending or authorization in a device), is necessary to capture "personal entropy," or information about oneself that can be more closely guarded and less open to theft versus a password or pass phrase. Secrets must differ from identification. The larger body of data to search to discover these secrets act as a higher form of secrecy. These datum may be converted to readable text in some embodiments or maintained in digitally-sampled but humanly perceptible form in other embodiments (favorite restaurant is represented as an actual image of the restaurant, mother's maiden name is actually the voice of an individual's maternal grandparents, highly specialized forms of personal information that may be dynamically changed or checked quickly and conveniently without undue risk exposure to the system).

For governments and individuals, piracy of identity is the most insidious risk exposure. Identity theft may be curtailed with devices that can transduce, in real time, an iris scan, fingerprint or other biometric and compare securely transmitted results with a secured stored record at the time of initialization. Alternatively, this may be accomplished with an unrelated Unique ID that confirms the identity of the user, and may be created and stored on the device. Because governments are arbiters of trust in markets (their actions in the collective affect trust and confidence in products and markets), these devices are able to alert consumers to potential risk for a given product or service (represented by some ruling or law that is important to convey to the consumer, such as with alcohol, medications, or tobacco). These devices could, at the discretion of the user, indicate related warnings for which the government has an interest in safety. In one embodiment, by checking an actual cigarette carton, or drug packaging, with the enabled device, counterfeit packaging may also be detected. In one embodiment of the present invention, bar code scanners may be "required" to also check for embedded or associated signals indicating authenticity. The devices may also check if supposedly "real" prescription drugs are authentic. Such a check may occur when using the device to communicate with a vendor and check to see if any complaints or problems exist in stored records; again the packaging may be checked for authenticity in cases where counterfeits are high and difficult to check without some form of secure watermarking or perception-based authentication that can be efficiently handled by an enabled device.

According to one embodiment of the present invention, digital content may be distributed through a local content sever, or LCS. In general, the LCS environment is a logical area inside which a set of rules governing content use may be strictly enforced. The exact rules may vary between implementations, but in general, unrestricted access to the content inside the LCS environment is disallowed. The LCS environment has a set of paths, or paths that allow content to enter the domain under different circumstances. The LCS environment also has paths that allow the content to exit the domain.

The act of entering the LCS environment may include a verification of the content (an authentication check). Depending upon the source of the content, such verification may be easy or hard. Invalidatable content may be subjected to a quality degradation. This degradation may be to the content itself, or it may be removal of value-added components. Content that can be validated, but that belongs to a different LCS environment may be excluded. The primary purpose of the validation is to prevent unauthorized, high-quality, sharing of content between environments.

When content leaves the LCS environment, it may be watermarked as belonging to that environment. It is allowed to leave the LCS environment at the quality level at which it was stored (i.e., the quality level determined by the path). The watermark on the exiting content may be both an embedded digital watermark and an attached hash or digital signature (it may also include a secure time stamp). Content cannot return into the environment unless both the watermark and hash can be verified as belonging to this environment. The presence of one or the other is generally sufficient to allow re-entry.

This system may allow a certifiable level of security for high-quality content, and may allow the use of unsecure content at a degraded quality level. The security measures are such that a removal of the watermark constitutes only a partial failure of the system. The "wiped" content may be allowed back into the LCS environment, but only at a degraded quality level, a result of the watermark destruction and subsequent obscurity to the system. Consumers will not be affected to the extent that the unauthorized content has only been degraded, but access has not been denied to the content. Only a complete forgery of a cryptographically-secure watermark will constitute a complete failure of the system. For a discussion on such implementations please see U.S. Pat. No. 5,613,004; U.S. Pat. No. 5,687,236; U.S. Pat. No. 5,745,569; U.S. Pat. No. 5,822,432; U.S. Pat. No. 5,889,868; U.S. Pat. No. 5,905,800, U.S. Pat. No. 6,078,664, U.S. patent application Ser. No. 09/046,627 U.S. patent application Ser. No. 09/053,628, and U.S. patent application Ser. No. 09/594,719.

Provable security protocols may minimize this risk. Thus, the embedding system that embeds the watermark does not need to be optimized for robustness, only for imperceptibility (important to publishers and consumers alike) and security (more important to publishers and commercial interests in the content than to consumers). Ideally, as previously disclosed, security preferably does not obscure the content, nor prevent market participants from accessing information contained therein, and for the longer term, developing trust or creating relationships.

The system can flexibly support "robust" watermarks as a method for screening content to speed processing. Final validation, however, is relied upon the fragile, secure watermark and its hash or digital signature (a secure time stamp may also be incorporated).

The LCS provides storage for content, authentication of content, enforcement of export rules, and watermarking and hashing of exported content. Stored content may be on an accessible rewritable medium, but is preferably stored as ciphertext (encrypted or scrambled), not plain text, to prevent system-level extraction of the content. This is in contrast to known systems, which affix or otherwise attach meta-data to the content for access control by the variously proposed systems.

The LCS may be able to receive content from a secure electronic content distributor, or SECD, and may be able to authenticate content received via any of the plurality of implemented paths. The LCS may monitor and enforce any rules that accompany received content, such as number of available copies. Finally, unless being transmitted to a satellite unit, the LCS may watermark all exported material and supply a hash made from the Unique ID and the content characteristics (so as to be maintained perceptually within the information and increase the level of security of the watermark).

The satellite unit enables the content to be usable apart from the LCS. The satellite unit is partially within the LCS environment. A protocol may exist for the satellite unit and LCS to authenticate any path made between them. This path may have various levels of confidence set by the level of security between the satellite unit and LCS, and determinable by a certification authority or its equivalent, such as an authorized site for the content. The transfer of content from the satellite unit to the LCS without watermarking may be allowed. However, all content leaving the satellite unit is preferably watermarked. The satellite unit watermark may contain a hash generated from the satellite unit Unique ID and the content characteristics. If the content came from a LCS, the satellite unit may also add the hash received from the LCS to the watermark. The LCS and satellite unit watermarking procedures do not need to be the same. However, the LCS is preferably able to read the satellite unit watermarks for all different types of satellite units with which it can connect. The satellite unit does not need to be able to read any LCS watermarks. Each LCS and satellite unit preferably has a separate Unique ID.

Figure 2:
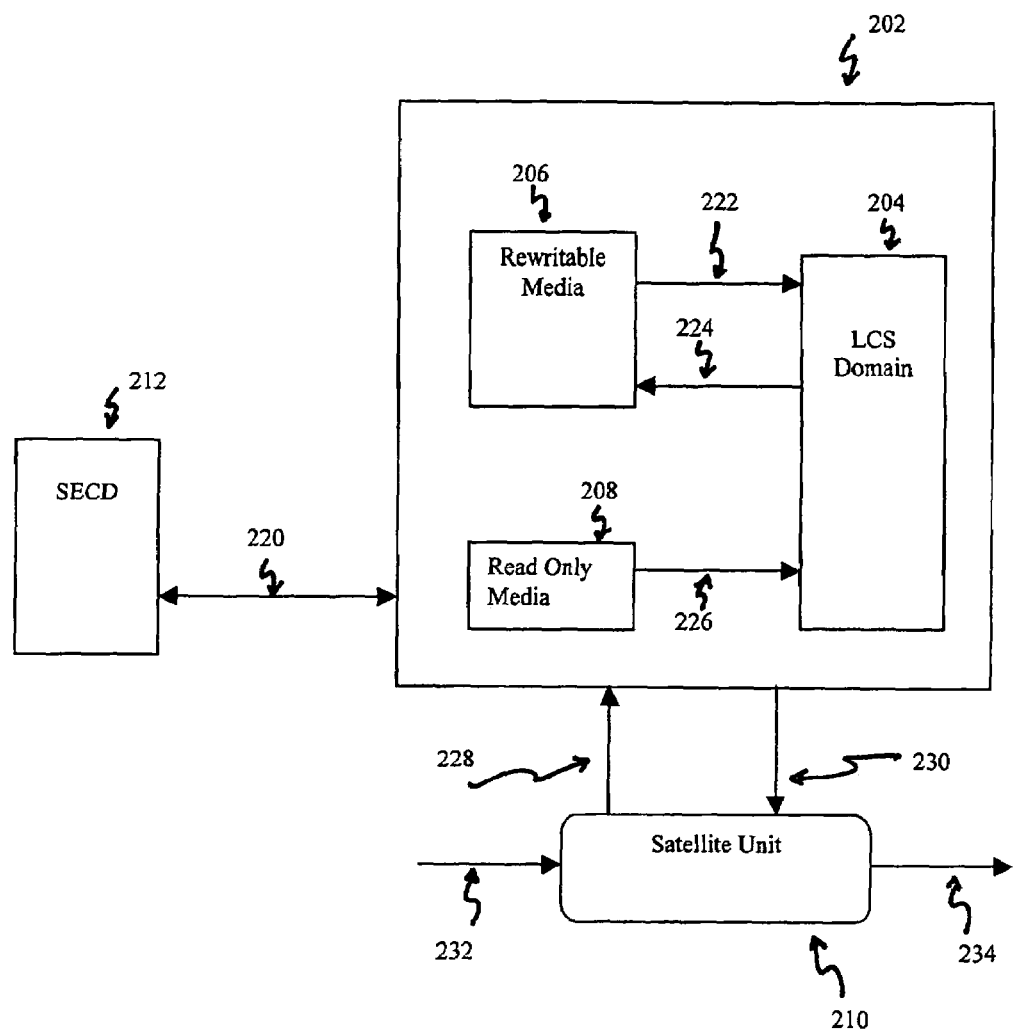
FIG. 2 is a schematic of a local content server environment according to one embodiment of the present invention.

Referring to FIG. 2, a schematic of a local content server environment according to one embodiment of the present invention is provided. LCS 202 may be a software device running on a general purpose computing device, such as a personal computer (including, in general, a central processing unit, an input, an output, a memory, and a power supply). LCS 202 may include local content server domain 204, rewritable media 206 (such as a hard disk drive, a CD-R/W, etc), and read-only media 208 (such as a CD-ROM). LCS 202 may communicate with at least one satellite unit 210 via an interface.

In one embodiment, LCS 202 may have a Unique ID. Similarly, in one embodiment, satellite unit 210 may have a Unique ID.

LCS 202 may communicate with SECD 212 via a network, including a local area network, a wide area network, an intranet, and the Internet. This communication may also be established by a telephone link, a cable connection, a satellite connection, a wireless connection, etc.

In one embodiment, a single LCS 202 may interface with more than one SECD 212.

A plurality of paths 220, 222, 224, 226, 228, 230, 232, and 234 may exist among LCS 202, SECD 212, Satellite unit 210, LCS domain 204, rewritable media 206, and read-only media 208. Each will be discussed in greater detail, below.

Digital content may be securely distributed to LCS 202 from SECD via path 220. The content may be secured during the transmission using one or more security protocols (e.g., encryption or scrambling of the content). In one embodiment, if LCS 202 interfaces with multiple SECDs 212, each path may use a different security protocol.

The security protocol may use an asymmetric cryptographic system. An example of such a system includes a public key cryptography system. The private and public key pairs allow LCS 202 to authenticate and accept the received content.

Figure 3:
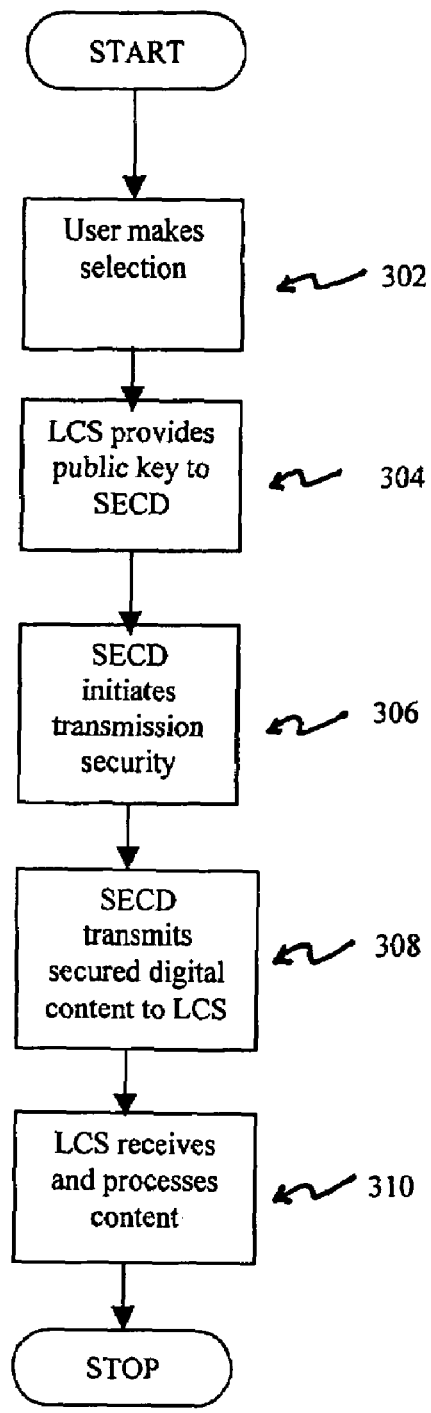
FIG. 3 is a flowchart depicting an example of an authentication according to one embodiment of the present invention.

Referring to FIG. 3, a flowchart depicting an example of an authentication by LCS 202 is provided. In step 302, the user connects to the SECD, makes a selection, and completes a sale.

In step 304, the LCS provides its public key to the SECD.

In step 306, the SECD uses the LCS public key to initiate transmission security.

In step 308, the SECD transmits the secured digital content to the LCS.

In step 310, the LCS receives the digital content, authenticates that the digital content was unchanged during transmission, and unpacks it from its security wrapper (that may include a secured transmission line, such as SSL). In one embodiment, the digital content may be authenticated by a watermark and hash check. If the content can be authenticated, the content is accepted into the LCS domain. If the content cannot be authenticated, it is rejected.

Figure 4:
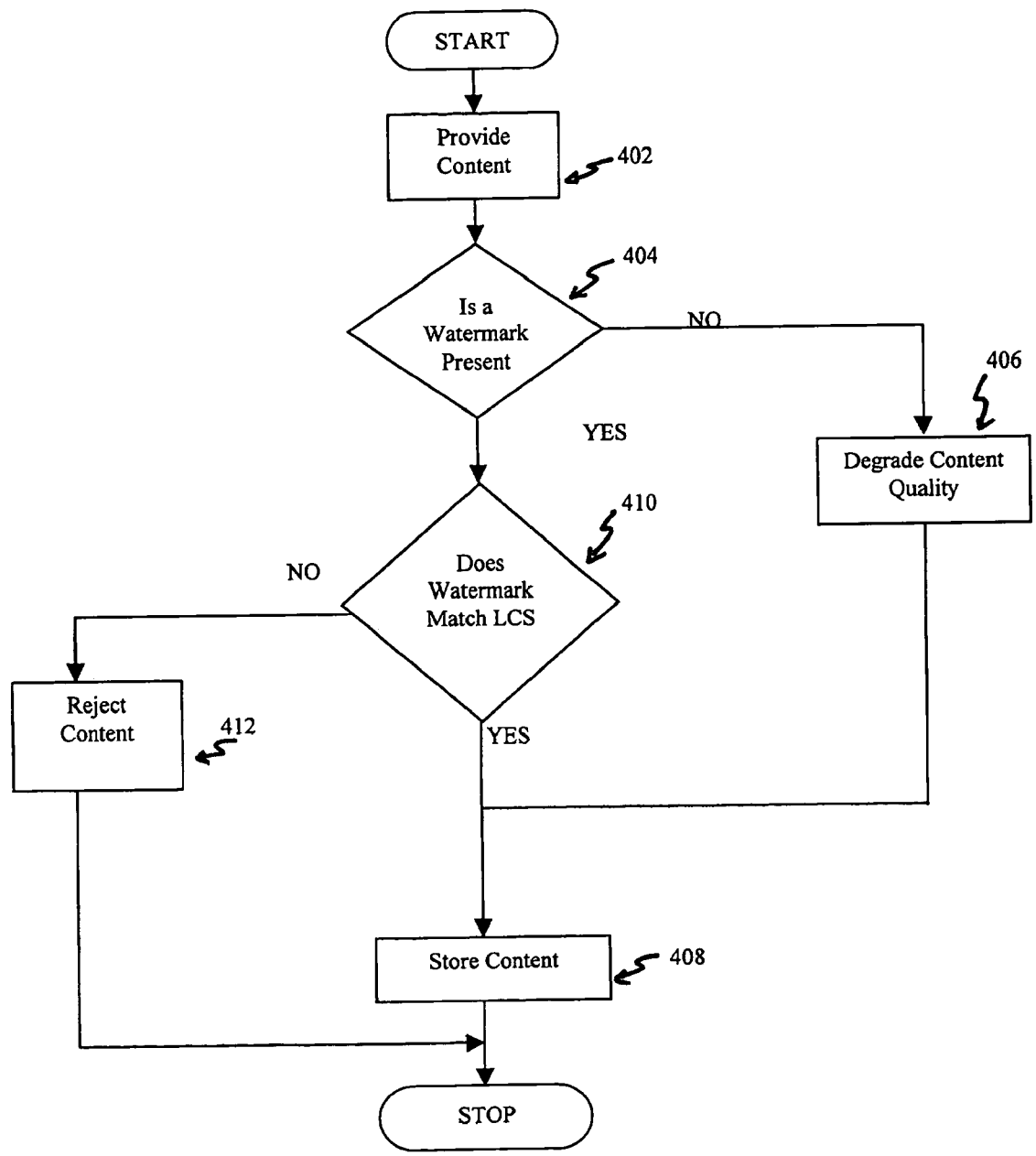
FIG. 4 is a flowchart depicting an example of content flow according to one embodiment of the present invention.

Referring again to FIG. 2, path 222 connects LCS domain 204 with rewritable media 206. Referring to FIG. 4, a flowchart depicting the process for content entering LCS domain 204 from rewritable media 206 is provided. In step 402, the content is provided. In step 404, the content is checked for the presence of a watermark, such as a watermark for the particular LCS. If there is not a watermark, in step 406, the content is degraded to Low Quality and, in step 408, the content is stored in the LCS domain.

If, in step 404, a watermark is present, in step 410, the watermark is checked to determine if it matches the LCS. This may be achieved by a hash. If the watermark is verified, in step 408, the content is stored in the LCS. If the hash does not match, the content is rejected.

Referring again to FIG. 2, LCS domain 204 may export content to any receiver (other than satellite unit 210) through path 224. This may include copying content to a rewritable media, creating a read-only media, rendering the content for use (e.g., playing, viewing, etc), etc.

Figure 5:
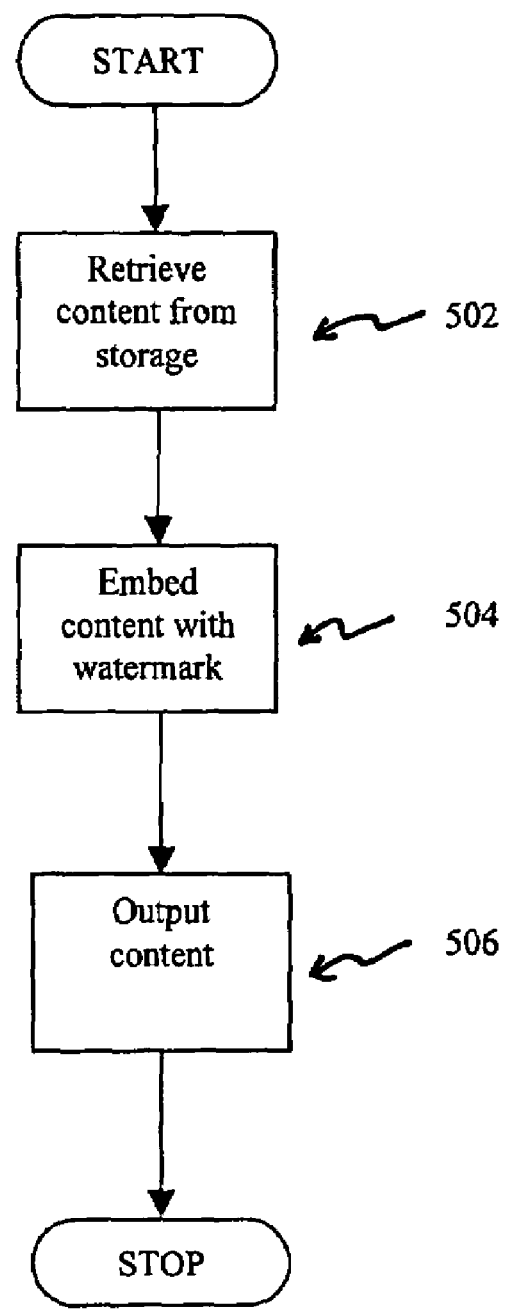
FIG. 5 is a flowchart depicting an example of content flow according to one embodiment of the present invention.

Referring to FIG. 5, a flowchart depicting the process for content leaving LCS domain 204 is provided. In step 502, the content is retrieved from storage within the LCS. In step 504, the content is embedded with a watermark. In one embodiment, the watermark may be unique to the particular LCS, as determined by the LCS Unique ID. The watermark may contain a hash that is created from the combination of the content characteristics (such as signal features, etc.) and the Unique ID. The watermark may optionally contain other data, such as a timestamp, a number of allowable copies, etc. This would be described as parameters of use, usage data, etc. which could be referenced when content is exported. If the export is to a storage medium, the LCS optionally can add a second hash to the file, external to the content, which can be used for further authentication. For security purposes, in one embodiment, the external hash may be created in a different manner from the embedded, watermark hash.

In step 506, the content is output from the LCS to the receiver.

Figure 6:
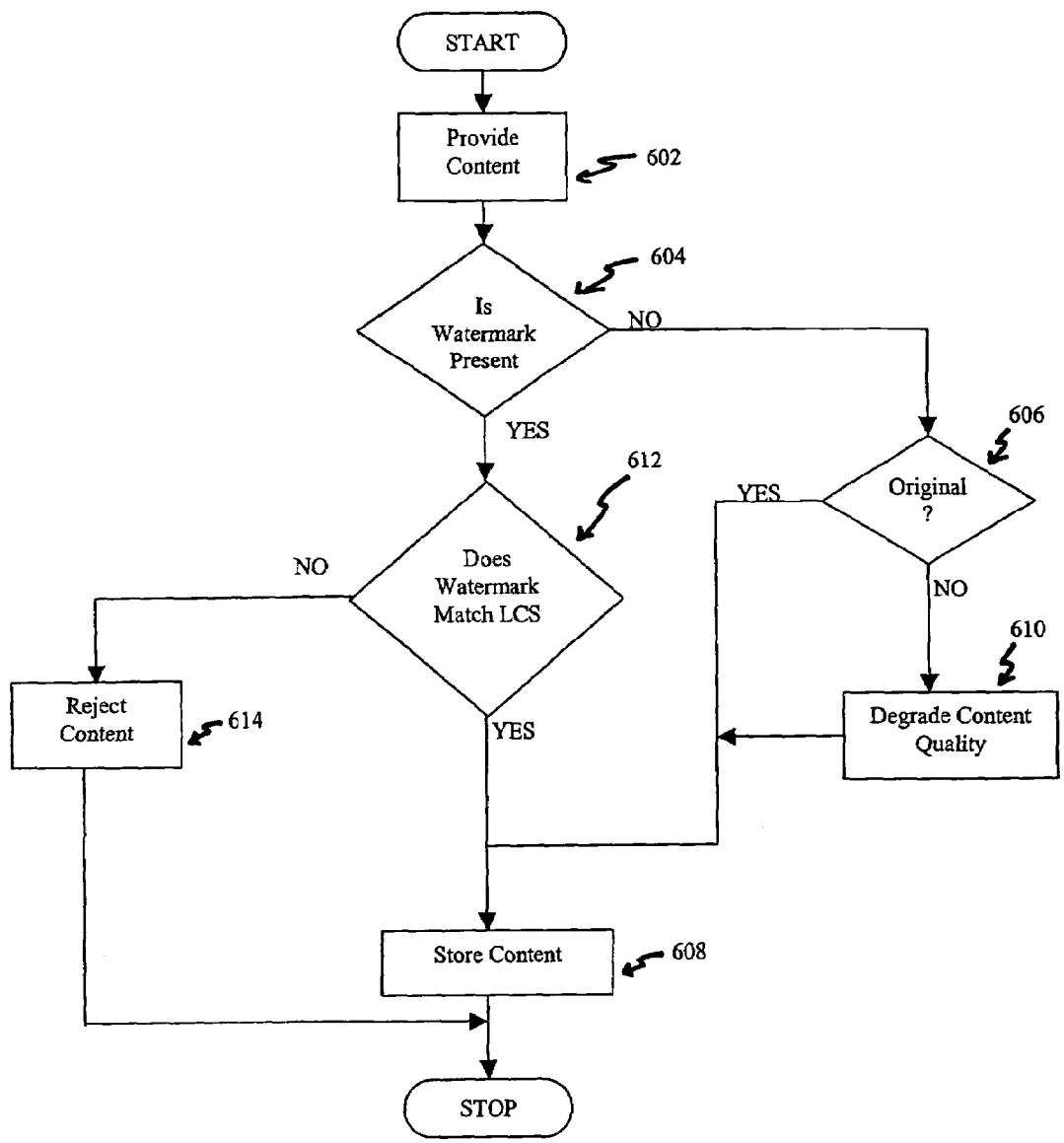
FIG. 6 is a flowchart depicting an example of content flow according to one embodiment of the present invention.

Referring again to FIG. 2, path 226 connects LCS domain 204 with read-only media 208. Referring to FIG. 6, a flowchart depicting the process for content entering LCS domain 204 from read-only media 208 is provided. In step 602, the content is provided. In step 604, the content is checked for the presence of a watermark, such as a watermark for the particular LCS. If there is no watermark, a check is made in step 610 to see if the originality of the content can be determined. An example of such includes a media-based identifier that identifies the content as original.

If the content can be verified as an original, in step 608, it is stored as High Quality in the LCS domain. If the originality cannot be verified, in step 610, the quality is degraded to Standard Quality, and, in step 608, the content is stored in the LCS domain.

If a watermark is identified in step 604, in step 612, the hash is checked to verify that the content matches this LCS. If it matches, in step 608, the content is stored in LCS domain at High Quality. If it does not match, in step 614, the content is rejected.

Figure 7:
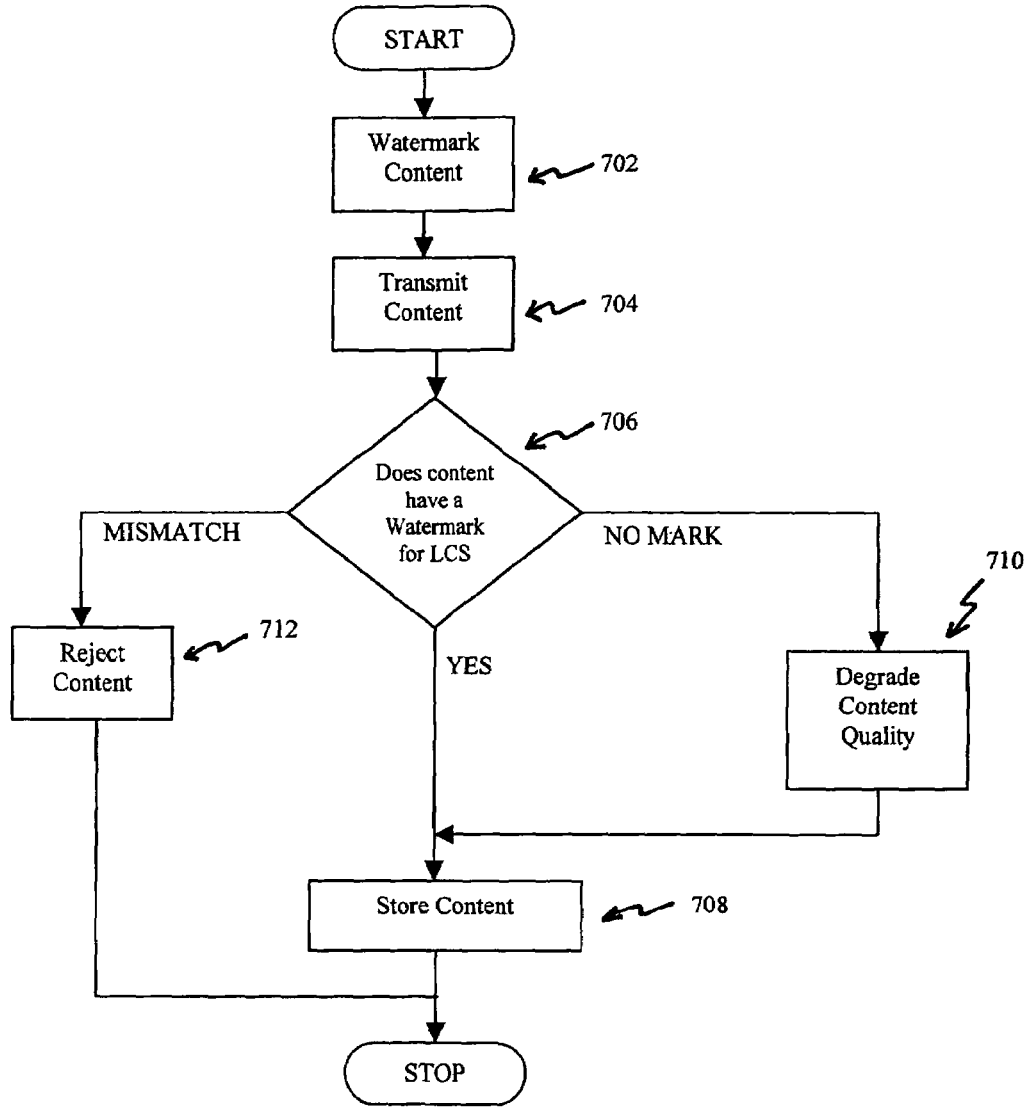
FIG. 7 is a flowchart depicting an example of content flow according to one embodiment of the present invention.

Referring again to FIG. 2, path 228 connects LCS 202 with satellite unit 210. Referring to FIG. 7, a flowchart depicting the process for content entering LCS 202 from satellite unit 210 is provided. In step 702, the content may be watermarked before it is transmitted to the LCS. In step 704, the content is transmitted to the LCS.

In step 706, the content is checked by the LCS. This may include checking the LCS hash. If the hash matches, in step 708, the content is stored in the LCS domain as High Quality. If there is no hash, in step 710, the content is degraded to Low Quality, and in step 708, the content is stored in the LCS domain. If the hash does not match, in step 712, the content is rejected.

Figure 8:
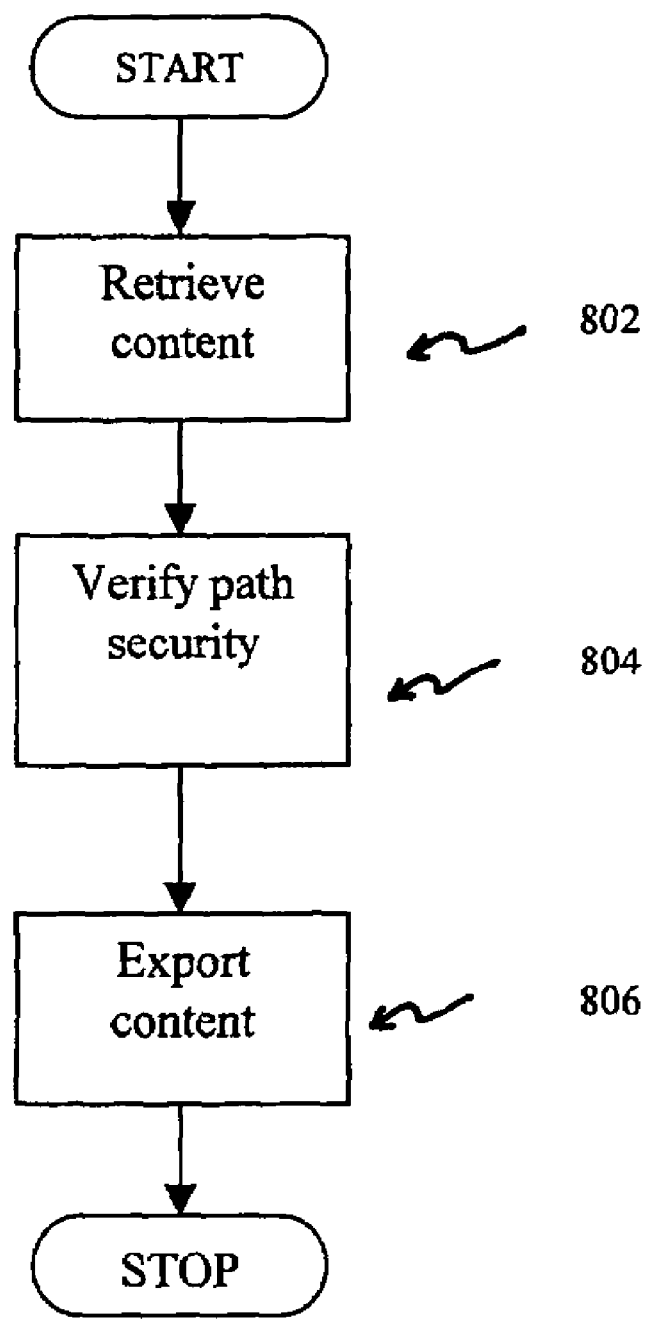
FIG. 8 is a flowchart depicting an example of content flow according to one embodiment of the present invention.

Referring again to FIG. 2, path 230 connects LCS 202 with satellite unit 210. Referring to FIG. 8, a flowchart depicting the process for exporting data from the LCS 202 to satellite unit 210 is provided. In step 802, the content is retrieved from storage within the LCS. In step 804, the security of the path between the LCS and the satellite unit is verified. Once the security is verified, in step 806, the content is exported to the satellite unit without a watermark.

If the security of the path cannot be verified, the export process mirrors that of an export to a receiver, depicted in FIG. 5.

Referring again to FIG. 2, path 232 is a path for content to be stored in satellite unit 210. In one embodiment, all content may be allowed to be imported into satellite unit 210, but may be automatically degraded to Low Quality when it is stored.

Path 234 is an export path for content rendered by satellite unit 210. In one embodiment, this content may be marked with a satellite unit watermark that contains a hash from the satellite unit Unique ID and any hash that is associated with the content from an LCS.

It should be noted that a hash function may be converted into a digital signature by performing a hash and encrypting the result of the hash. The uniqueness of the hash can vary with the hash function, while the digital signature adds a layer of confidence to the integrity of the data.

Other types of encryption, including transfer functions, may also be used.

Figure 9:
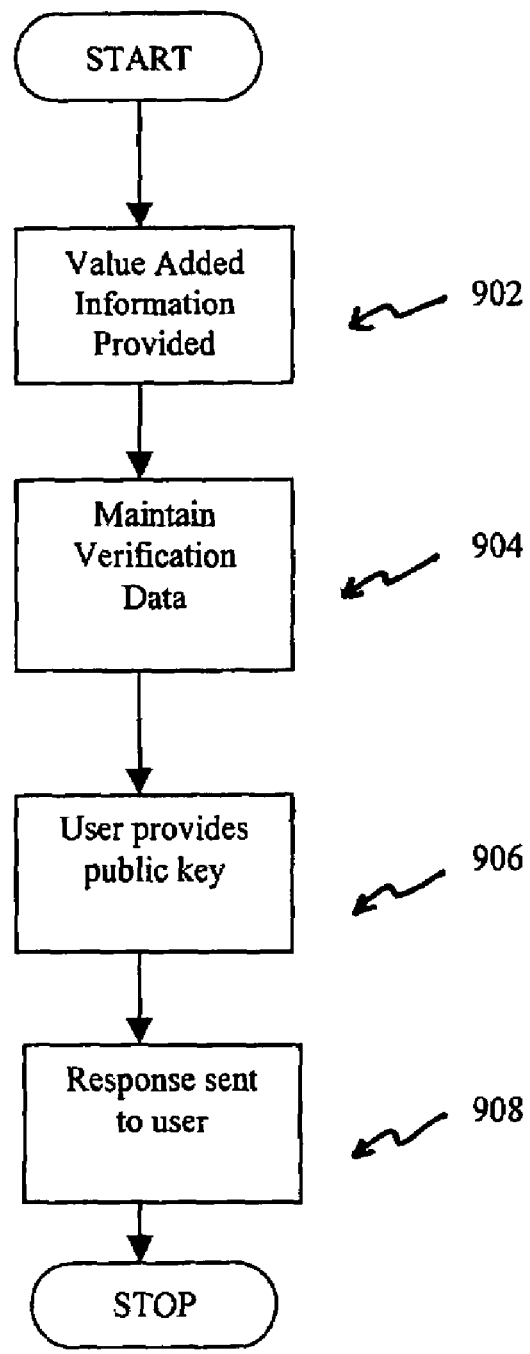
FIG. 9 is a flowchart of a method for trusted transactions according to one embodiment of the present invention.

Referring to FIG. 9, a flowchart of a method for trusted transactions according to one embodiment of the present invention is provided. In step 902, value-added information, or its tangible equivalent, is provided. This may be provided by a user that wishes to verify the value-added information.

In step 904, the perceptible data for verification may be maintained by a vendor or provider, and may be updated by a public-key secure digital watermark in the observable packaging (if applicable). In those cases where security must be high, real time, or simply faster, key generation or signature generation functions may be enabled with embodiments of the present invention.

In step 906, the user provides a public key based on the identify held in the device to enable an authentication check.

In step 908, a response may be sent to the user.

Steps 906 and 908 may be repeated with further prompting for higher levels of authentication, or for additional checks. If the remote location provides the confirmation, or if a certification authority is involved, the response may be sent via secure transmission lines (e.g., encrypted transmission that can only be decrypted with the user's device and access to the user's stored private key). Alternatively, information may not need to be sent in a secure manner and may be checked upon delivery to the device to limit any remote communications breaches by unintended third parties.

Figure 10:
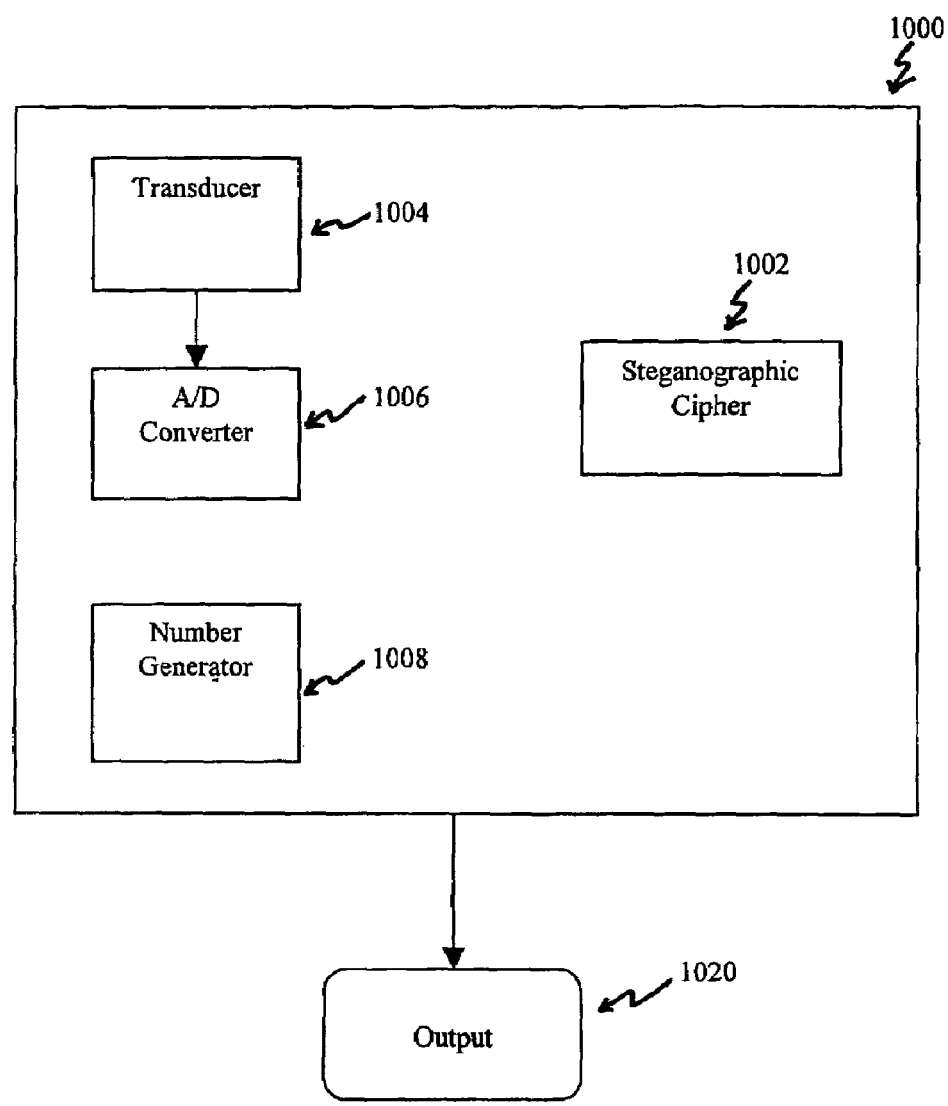
FIG. 10 depicts a device for trusted transactions according to one embodiment of the present invention.

Referring to FIG. 10, a device for trusted transactions according to one embodiment of the present invention is provided. Device 1000 may include steganographic cipher 1002. Steganographic cipher 1002 may be governed by at least the following elements: (1) a predetermined message; (2) a predetermined key/key pair; and (3) a predetermined carrier signal (image data, so images will be the primary data represented and ciphered).

Transducer 1004 may be provided. Transducer 1004 may include a charged coupled device (CCD), a personal entropy capture device (e.g., a retinal scanner, a thumbprint scanner, etc.), a touch pad (e.g., a pad for receiving a signature), an image capture device, a bar code reader, a magnetic card reader, etc. Transducer 904 receives the data in a physical format and converts it to an analog or digital format.

In one embodiment, the data from transducer 1004 may be marked with a timestamp for time-critical input.

Analog/digital converter 1006 may be provided. A/D converter 1004 may be used to convert analog information from transducer 1004 into predetermined digital format. In one embodiment, signatures may be converted in one format, images that are captured in another format, and fingerprint/iris scans may be converted in another format.

A memory may be provided. The memory may include both volatile memory, and re-writable memory, such as DataSlim™.

A volatile device may be provided, such as a one time pad (private key of card holder/user), a one time memory or floating in the volatile memory to evade capture (stegacipher computer code). This may be provided in a tamperproof casing.

Device 1000 may also include output 1020. Output 1020 may be any suitable output, including a connection port, a wireless port, a radio transmitter, etc. Before information is output from device 1000, it may be encrypted. In one embodiment, the information may be digitally watermarked. In another embodiment, the information may be digitally signed. In another embodiment, the information is not encrypted, and instead is transmitted over a secure transmission channel. Number generator 1008 may be provided. Number generator may be a random number generator, or it may be a pseudo-random number generator.

In addition, the device may include a controller, a power source, and an input and an output.

Information may be converted into a humanly perceptible form (chemical/electrical/magnetic such as a humanly visible chemical test result, as with a pregnancy tests, an EKC, an MRI or CatScan image, are all converted into "humanly perceptible form for "human" analysis) prior to authorization of a transaction/decision event.

EXAMPLES

In order to better understand the present invention, several examples are provided. These example do not limit the present invention in any way, and are intended to illustrate embodiments of the present invention.

1. Smart Telecommunications

At present, large volumes of commerce and commerce-related activities are performed using telephone connections. Authentication of identity is an ongoing concern in such transactions. Present technology allows the verification of the origin of a landline phone call (POT), but offers no assurances as to the identity of the user. Furthermore, simple identification of the origin of the call is only useful insofar as that phone number can be used to index a database of callers. The present invention allows for bi-directional verification of identity during a phone call, with the option of partial or full concealment of identity.

A consumer may wish to make a purchase on the phone. Presently, the consumer's identity is established by the seller using personal information from the consumer, such as a credit card number, an address, a phone number, etc. However, all of this information may be known by an imposter. A smart phone transmits identity information (perhaps embedded as a watermark in the audio connection), in response to a query from the seller. The receiver verifies the buyer's identity with a certification authority. Furthermore, the consumer may also verify the authenticity of the seller's identity at the same time, by the same method. The consumer may choose not to respond to certain queries in real time.

The smart phone may require a level of identity disclosure before it accepts an incoming call. For instance, telemarketers may be required to reveal the name of their company before the call is accepted by the smart phone. Consumers may protect themselves from fraudulent sellers by requiring such identification. Further, legitimate sellers may be assured that their customers know that they are legitimate. The certification authority assures the consumer and seller that they are receiving authentic identifications.

2. Equity Programs as a Value-added Component

Another embodiment of the present invention relates to methods and means of payment includes a novel means for encouraging alignment of buyer and seller interests. Similar to cooperatives, membership programs (in proprietary form, co-branded with a financial institution, or implemented as a specialty device that can handle these equity transactions) may be enhanced to offer buyers the opportunity to purchase options in equity of the seller's company or related institution. Instead of being given cash or points, at some fixed point in time, consumers and sellers may be provided with the opportunity to purchase equity as available on some public or private market or exchange.

These options may be built into the functionality of the actual transaction device and may be coupled with both trusted transactions or general transaction systems. Settlement of the option may be based on any known option pricing mechanism (such as the well-known Black-Scholes model) and predetermination of terms for settlement and conversion of the option. This approach incentivizes and encourages clearer alignment of all market participants in the value and condition of the equity of the entity with which transactions are being handled or negotiated. Independent certification authorities, or infomediaries that are able to ensure or verify a transaction or related information, may be used to ensure that such equity programs can be trusted. Any relevant disclosures concerning legal or financial restrictions are simply additional value-added components for consideration.

3. More Security-Body Movements for Entropy and Pharmaceutical Use Control

A related embodiment according to another embodiment of the present invention includes an interface for detection of body movements (eye movements, blinks, voice pass phrases, etc.). These movements may include predetermined sequences of movements that may be ciphered in a manner similar to encrypting ASCII pass phrases. This is a novel implementation of human movement in generating symmetric or asymmetric cryptographic keys. The transducer may include any number of means of capturing human-based body movements in real time for instantaneous verification of an authorized user. Moreover, unlike simple biometrics, a series of body movements (similar to the act of signing in writing, but likely to be more difficult to capture for unauthorized misuse—a signature, like a fingerprint, is able to be observed and copied without permission or knowledge of the signature author) is difficult to copy.

The movements or similar biological entropy (transduced from biomedical, bioengineered, biochemical or biophysical information that may be made perceptible and encrypted or securely watermarked for later comparison or real time verification) may be captured by a transducer of analog signals and converted into digital binary information used for comparison with any number of stored corresponding instructions or messages to be decrypted. These signals may be multidimensional (2D, 3D, 4D- with a time component, etc.) to increase the information space and make discovery of hidden secrets more computationally difficult. Images, medical or human-condition based, audio signals, video, virtual reality, multimedia, etc. all provide rich media information in which to enhance the security of any embodiment contemplated by the present invention. Combinations of multidimensional media for varying ciphering options as well as steganographic embedding are also contemplated as a means for furthering ensuring computational complexity to any unauthorized user. Steganographic-mapping (watermarking) or transfer functions (scrambling or "chaffing") may be combined with encryption ciphers as a means for making each unique implementation or tangible device— serialization or personalization of a method for engaging in trusted transactions, high risk, information-intensive or sensitive decision (military use, security use, restricted government use, privacy use, or any number similar commercial or noncommercial decision or transaction events).

Additional embodiments include actual control over the use or access to pharmaceuticals based on medical risk, condition or personalized advice to the user. Tangible methods for transfer of chemical, biological or physical agents intended for medical use or individualized control based on third party conditions (legal, medical, governmental, etc.) are governed by manipulation of the apparatus, device or system used to introduce foreign agents (informational, intangible or tangible) into patients (the intended, authorized or verified user).

Highly secure and artificial environments, such as aircraft flying simulations or visual financial trading information, may be representative of more risk to owners of actual tangible planes or tangible assets related to any financial information. Recognition of a digitized iris does not enable movement based confirmation of future secrets (the movements) that may be changed, destroyed or updated to ensure consistent or higher degrees of security maintenance. For some body movements, it may be possible to maintain better security than with written information. In other words, certain body movements may be prevented, or made difficult to perform even under rigorous demand by unauthorized agents. Blinking or other facial movements may be made impossible to verify the real time identity of the user. This adds a layer of security and increases the difficulty of defeating a cipher or a series of related ciphers (encryption-based or steganographically-based, where the digitized signal has humanly-perceptible fidelity or characteristics) depending on access or sensitivity of information. It also maybe psychologically or human-rule driven. Certain humanly observable body movements, or detectable "telemetry-type" data (brain activity, heart beat, pulse, or any other medically observable information) may be either unique to an individual or simply general to certain behavior. This data may be important to use as a means of preventing poor decision-making, or requiring higher diligence before transacting or executing a given operation. At the least, the movements are a means for predetermining and assisting the generation of a binary key or seeding the generation of a cryptographic key, message or signature.

Any particular instance may be successively stored in subsets of any primary value information or value-added components (single key or key pair associated with a single message or signature to further serialize data that may have steganographic capacity for imperceptible embedding in the carrier signal, primary or value-added components data). The operation may be highly demanding, or may require human-based or driven or initiated decisions. The instructor, or the user, may have predetermined the conditions that indicate confidence or lack thereof at the time of the verification or authentication of the user. This may be for security reasons, or simply risk management, as information is increasingly processed at higher speeds and may require greater care in ensuring information data integrity. As well, humanly-observable (and convertible into binary data for deciphering) movements enable a form of bridging analog, human trust with digital or mathematically provable, actuarially, statistically, deterministically known or predictable measures of risk and trust. This novel feature is an additional benefit over the prior art and ensures future human-like characteristics in "digital" (underlying, "measurable" or "estimable" data integrity, authentication and confidence), electronic (analog transducers and transmitters), or binary transaction systems. Further security or serialization of transaction event information (human movement or observable condition used for secret key or equivalent generation) enable additional forms of trusted transactions.

Additional security may be assured with temporal-based limits on human body movement or biologically observable human condition (by use of a medical or human directed transducer). Interlocking keys and messages with blind signatures, or onion routing transmission techniques to obscure the identity of the user, are further enhancements that may guarantee a high level of privacy to the user of the system or device. Information formats may be encrypted or have stored primary or value-added component information that has to arrive to the user without any digitally evident tampering for the user to make the best possible decision regarding the observed information.

Unlike the prior art, embodiments of the present invention consider the perceptibility of information to bridge human trust and confidence with cryptographic or "mathematical" measures or estimates of "security," "data integrity" or "trust." This is novel to the art of data security and secured transaction or transmission technologies.

4. Algorithmic Information Theory (AIT) for Additional Security

By implementing predetermined indications of mathematically provable randomness, the ability to discover secrets and human choice, based on unprovability or incompleteness, as discussed and is well-known in the art as originating with Godel (incompleteness theorem) and Turing (halting problem, uncomputability). Chaitin "discovered" randomness, stating essentially that randomness can be described mathematically, and thus differentiations between discrete and infinite randomness are logically observable. Because truth is relative in a quantum mechanical sense, degrees of credibility concern the level of trust that may be offered in any trusted transaction system. While the primary value that concerns us is information, the ability to describe programming size complexity (that is optimized functional data) enables self-limiting software to be programmed. To the extent that trusted transactions can never be physically perfect operations, uniqueness of information, as both data and code, is particularly important to providing higher security when computational cost and bandwidth is extraordinarily cheap.

Essentially, choice over answers to questions that cannot be characterized as "True" or "False," such as "This statement is false," have inherent randomness and are thus ripe for paradoxical response. More intricate paradoxes, Berry's Paradox, Turing's halting problem, as well as Chaitin's definition of "randomness," are sure to enable predictable infinite and finite (discrete) randomness with which to seed and cryptographic secret or generation of a symmetric, asymmetric key or digital signature. Human perception as a means for enabling analog trust may be made inherently more secure by choosing responses to paradoxes that have no computable value. That Chaitin can describe "randomness" with logically structured instructions for the halting problem, in LISP or C programming languages, including the computer programming language of Mathematica, enabled the development of a randomness constant.

The equations of randomness may be implemented in software and offer a unique and novel means for further securing the generation of cryptographic or steganographic seeds, secrets, keys or messages. Of course, differences between any of these information elements as to the means for securing or authenticating data would enable flexible architectures combining various ciphers and methods for arriving at a rule for validation, authenticity, data integrity, confidence or enabling any subsequent manipulation of the associated data (primary value-added or value-added components).

5. Entertainment Media Exchange

According to one embodiment of the present invention, the device may be used for the exchange of entertainment media. This may include audio, video, multimedia, etc. In such an exchange, the perceived risk of value-added information piracy is relatively high for the seller or provider, while the perceived risk is relatively low for the purchaser. The obvious risk is that all potential "consumers" of the media access and copy the entertainment media for free. For music or video, or similar entertainment good, according the present invention provides the following structure may be used.

a) Fragile Watermark Structure

The fragile watermark, according to one embodiment of the present invention, can actually hold an entire value-added component, encoded in the least significant bit (LSB) of each 16-bit sample. This gives a data rate of 88200 bits per second in a stereo CD file, or a capacity of 1.89 M in a 3 minute song. This is an immense capacity relative to the expected size of the value-added component (100–200K).

The fragile watermark is preferably bound to a specific copy (Unique ID) of a specific song (Unique ID), so that it cannot be transferred to other songs. This binding can be achieved through use of a hash in the following sequence:

(1) A block of value-added component is encoded into a block of samples.

(2) A hash of the value-added component block and a random number seeded by the owner's identity (Device or system Unique ID) is generated and encoded into the subsequent block of samples.

(3) A hash of the first two blocks of samples and a random number seeded by the owner's identity is generated and encoded into a third block of samples.

(4) Repeat steps 1–3 as necessary.

Each value-added component block may have the following structure:

```
{
            long    BlockIdentifier;        //A code for the type of block
            long    BlockLength;            //The length of the block
            ....                            //Block data of a length matching
BlockLength
            char    IdentityHash[hashSize];
            char    InsertionHash[hashSize];
}
```

An application can read the block identifier and determine if it recognizes the block type. If it does not recognize the block type, it can use the BlockLength to skip this block.

Certain Block Types are required to be present if the value-added component is to be accepted. These may include and identity block and a value-added component Hash block. The Block Data may or may not be encrypted, depending on whether the data is transfer-restricted (value-adding) or simply informative. For instance, user-added value-added component data would not need to be encrypted. The BlockIdentifier would indicate whether the block data was encrypted or not.

b) Robust Open Watermark

This is the mark that may indicate non-legacy content. In one embodiment, there may be two possible settings. "1" indicates non-legacy content that must be accompanied by a authenticable value-added component for entry into the domain (e.g., EMD or Electronic Media Distribution media content). "0", on the other hand, indicates non-legacy media that was distributed in a pre-packaged form (e.g., CDs, DVDs, game software, etc.). "0" content may or may not have a value-added component. "0" content may only be admitted from a read-only medium in its original file format (e.g., a "0" CD may only be admitted if it is present on a Red Book CD Specification medium).

c) Robust Forensic Watermark

This watermark may not be accessible to the consumer in any way. It may be secured by a symmetric key held only by the seller (or an asymmetric key pair that may be desired for some embodiments). A transaction ID may be embedded at the time of purchase with a hash matching the symmetric key (or key pair). The watermark may then be embedded using a very low density insertion mask (<10%), making it very difficult to find without the symmetric key. Retrieval of this watermark is not limited by real-time/low cost constraints. The recovery will only be attempted on pirated material. A recovery time of 2 hours on a 400 MHz PC is reasonable.

6. Additional Parameters for Value-adding Components

Physical shipment of packaged goods or services (value-added information) is anticipated as being a potential option to consumers or purchasers as well as sellers and providers. That the value-adding information may be packaged or represented tangibly does not obviate the need for trusted transactions to ensure payment and the appropriate division of rights and responsibilities for various goods (a DVD for music or video), services (smart credit card or insurance card) or markets (trusted telephone system, government identification schemes). This type of transaction represents additional benefits over embodiments in the existing art—on-demand trusted transactions and physical manufacture/delivery of goods is enabled, without risk to the overall system and its value-added information security. This amounts essentially to serializing or personalizing, depending on the perspective in the transaction, each and every transaction, while building trusted transactions for the benefit of the marketplace for goods services and information.

7. Financial or Insurance Device

The present invention enables systems and supported devices that are useful in situations where parties need to have pre-defined limits to risk exposure, such as an insurance policy or a claim. These systems are generally characterized by an emphasis on transmission and data security, which reduces the perceived risk of the insurer (a seller of risk coverage for predetermined events). To the extent that insurance takes into account the history and existing condition of an asset, a measure of context or structure (tangible as well as intangible) to be covered, as well as an economically-based replacement value (though to confuse matters, there are also issues concerning such items as after market versus brand new, brand versus generic, etc.), there exist differences with more transparent financial devices. Financial devices (essentially a "credit agreement" or credit facility based on an imprecise estimate of condition but also experience or trust) rely on the ability, perceived or actuarially observable, to repay credit extended on behalf of the device holder. Whereas financial or credit history is transparent in many cases, private information about an individual's history or condition are perceived to be have higher implicit value to the user. Financial devices and insurance devices converge at those points where privacy or personal information are equivalent with financial or credit information. Both types of risk have differing requirements for updating or adjustment over the course of use of a particular line of credit or insurance policy.

Cars may be embedded with telemetry sensors to determine the real time condition of various components, such as the frame, engine, brakes, or any combination of components mutually deemed to justify such monitoring. Alternatively, a smart card-like device equipped with a transducer may be used to "capture" images of items that are packed (for travel insurance purposes), insurable items in a residence (for homeowner's insurance purposes), etc. Any image captured may be securely watermarked by the device and then exported to an insurance provider via a transmission line (an ATM, a wireless connection such as a mobile phone, a PC modem connection, etc.). An insurance provider may offer such services at auto service/repair facilities, airports, etc. with a mutual reduction in claims costs and adjustments costs.

Medical information may similarly be digitally stored, securely watermarked, and time-stamped (for any perceptible data stored, such as images or voice) for reference to an individual's health based on varying levels of access to stored information, which may be distributed among different physicians or handled by a central medical information infomediary. The secured image may be sent to an insurance provider as a secured image (both the device and storage facility may independently verify the security or tamper-proofing of the perceptibly represented information). The doctor, patient, health care provider, government agencies can all have varying degrees of access that can be made transparent to the patient. This is an inherent benefit over the prior art in that the patient can see those records that are then watermarked and securely stored.

Additionally, the present invention provides the novel feature of enabling the same information, at the request or demand of the patient, to be sent to a personal or secure storage "space," so that patients may have more accessibility and control over their own medical records and medical conditions. In one embodiment, the information may be provided as digitized bits. In another embodiment, the data may be provided in a tangible form.

The information may be stored as tangible records or intangible, bit-represented records. Doctors may use tamper-proofed signals (watermarked audio, image, video, virtual reality, any humanly-perceptible signal) and records that are perceptible to lower insurance costs and potential liability. The prior art ignores the mutual benefits afforded by bi-directional information exchange (that can be tamper-proofed with secure watermarking) and transparency in creating opportunities for trusted transactions.

Additional data, such as the transaction information that may be evidenced on a credit card bill or statement, may also be automatically associated with the stored image(s) for later use. In one embodiment, the user may send the same secured data to a private data storage facility, or create personalized records, which may serve as a secondary set of records against which other data sent to the insurance or financial provider may be verified or validated. According to another embodiment of the present invention, authorized mechanics, physicians, and pharmacists, may add to, but not access or manipulate, previously stored data. These individuals may also be bound by rules for establishing the history and condition of any person or physical good that is being underwritten or financed.

The present invention provides certification authorities the ability to determine the authenticity of data. In cases where public-key steganography or cryptosystems are preferred, the embodiments extend to those implementations as well. Moreover, they enable secure transmission capabilities over unsecured data transmission lines.

Figure 11:
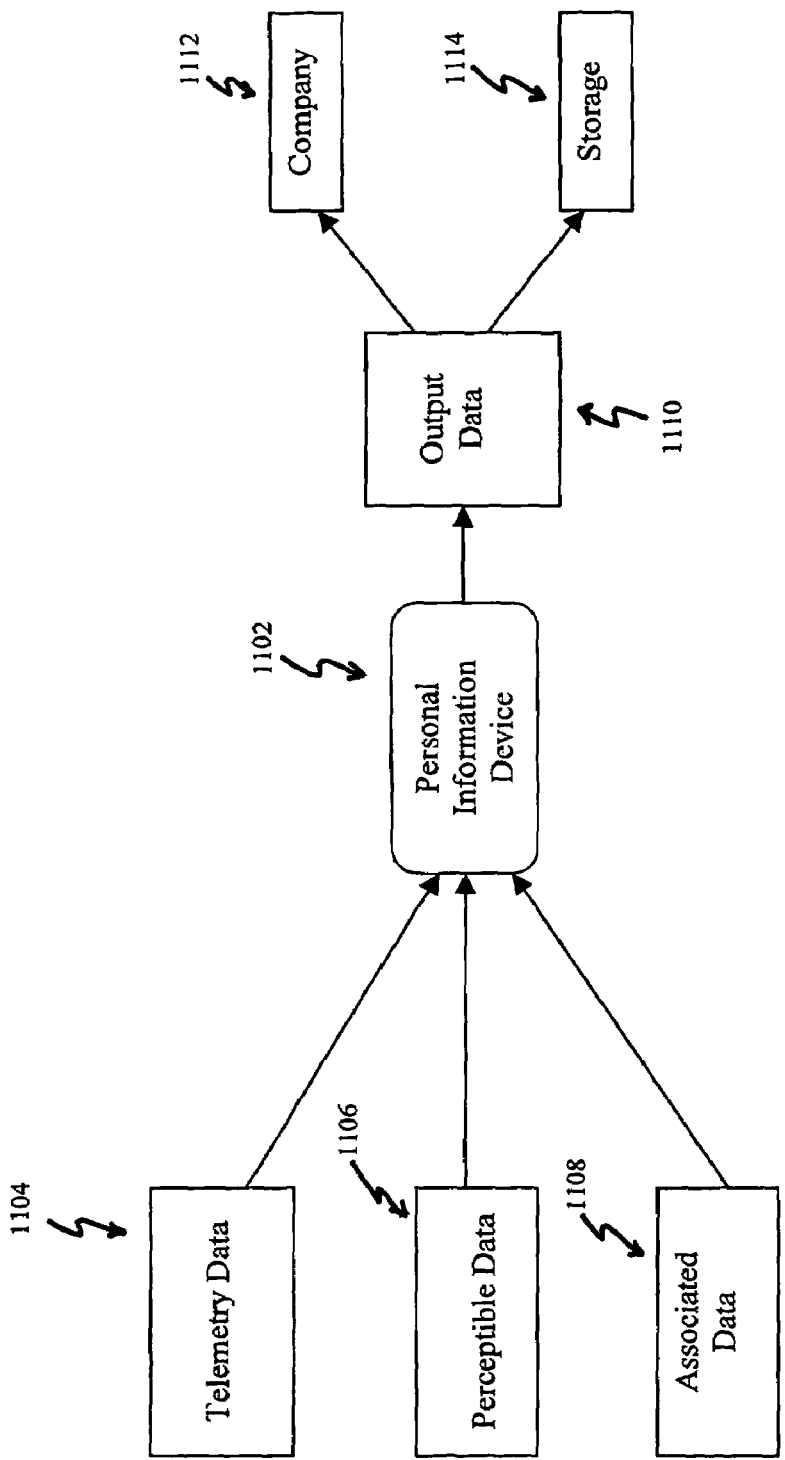
FIG. 11 is a block diagram of a person information device according to one embodiment of the present invention.

Referring to FIG. 11, a personal information device according to one embodiment of the present invention is provided. Personal information device (PID) 1102 may be used with financial institutions, insurance companies, etc.

In one embodiment, PID 1102 may be smart card; that is, a device that resembles a credit card, but includes a processor, a power supply, a memory, and an input and output device. In another embodiment, PID 1102 may be a card including a magnetic strip.

PID 1102 preferably has a Unique ID. In one embodiment, the Unique ID of PID 1102 may be a policy number, a social security number, etc.

PID 1102 may receive information from several sources. In one embodiment, telemetry data 1104 may be input to PID 1102. Perceptible data 1106, such as images, photos, etc. may be input to PID 1102. In still another embodiment, associated data, such as purchase receipts, descriptions, serial numbers, registrations, etc., which may be value-adding components, may be input to PID 1102.

PID 1102 may provide output data 1110 to a variety of entities. In one embodiment, output data 1110 may be provided to company 1112 and to storage 1114. Company 1112 may include any organization the may receive output data 1110, including an insurance company, a financial institution, etc. Storage 1114 may include any personal use for output data 1110, including a private data storage such as a fixed storage media, paper records, etc. Company 1112 and storage 1114 may receive output data 1110 in different formats. In one embodiment, output data 1110 is provided according to predetermined parameters for the entity.

Output data 1110 may be watermarked, or it may be time stamped, or it may include both. Other types of encryption are provided.

In general, output data 1110 is preferably provided to the entity via a secure communication link. Transmission of output data 1110 may be controlled by the entity (e.g., company 1112 or storage 1114) or by the user.

8. Authentication Device

Figure 12:
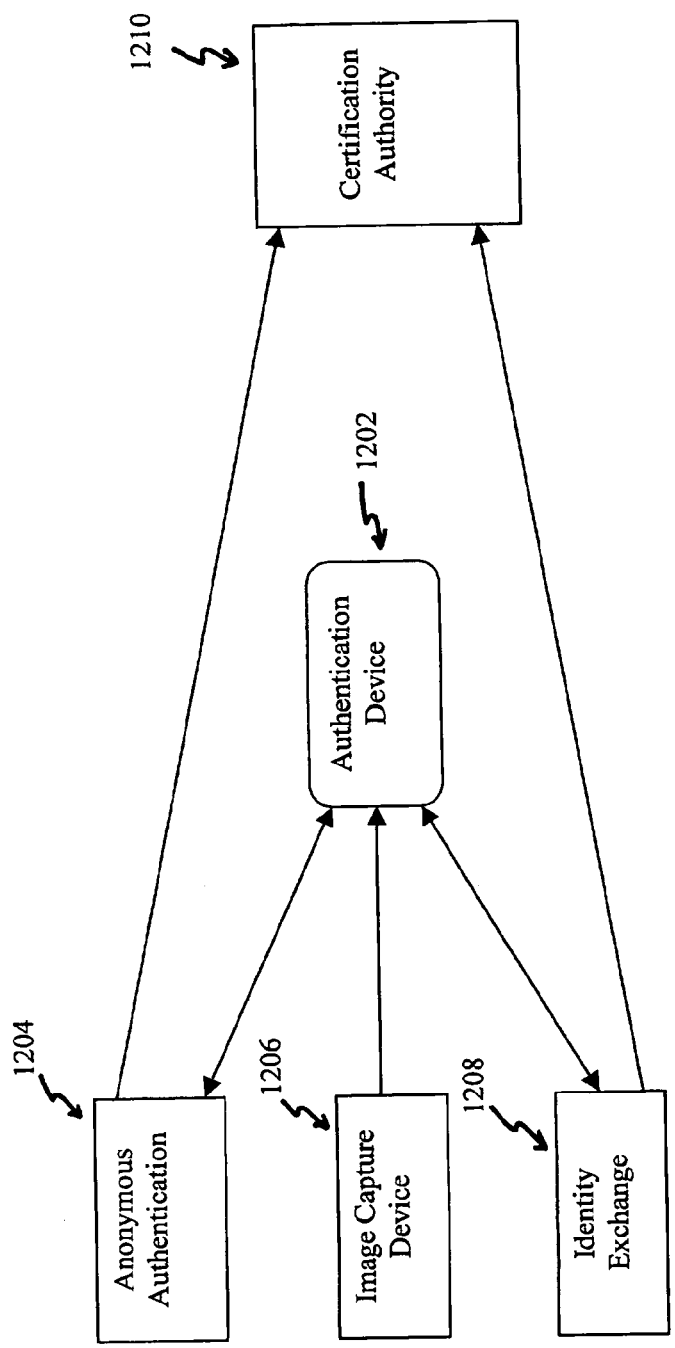
FIG. 12 is a block diagram of an authentication device according to one embodiment of the present invention.

According to another embodiment of the present invention, an authentication device may be provided. Referring to FIG. 12, authentication device 1202 may be a credit-card sized "smart card," including a processor, a power supply, a memory, and an input and output device. In another embodiment, authentication device 1202 may be a palm sized computing device.

A variety of input devices may be provided. In one embodiment, a bar code scanner may be used. In another embodiment, a keypad may be used. Other input devices may be used as necessary.

In one embodiment, authentication device 1202 may include a display, such as a LCD screen. Other display technologies are within the contemplation of the present invention.

In one embodiment, authentication device 1202 may be a government-issued device.

Anonymous authentication 1204 may be provided. Anonymous authentication 1204 may be used to authenticate a product, a medicine, a label, etc. Anonymous authentication 1204 communicates with authentication device 1202 to authenticate the item in question. In one embodiment, authentication device 1202 may display relevant information, such as known warnings, recommended dosages, etc. regarding the item in question.

In another embodiment, image capture device 1206 may be provided. Image capture device 1206 may include a digital camera, a scanner, etc. In one embodiment, image capture device 1206 may time stamp the image as it is captured.

Identity exchange 1208 may be provided. Identity exchange 1208 includes a Unique ID that may be authenticated or modified by the user. In one embodiment, in order to verify the identity of an individual, additional independent identify verification may be required in addition to identity exchange 1208. This is because authentication device 1202 may be stolen, borrowed, etc.

Certification authority 1210 may be provided. Certification authority may be bound by federal, state, and local laws. In addition, private restrictions may apply to certification authority 1210.

In one embodiment, certification authority may be further bound by geographical (e.g., location) or age basis (e.g., date of birth, age, etc.) to verify.

Figure 13:
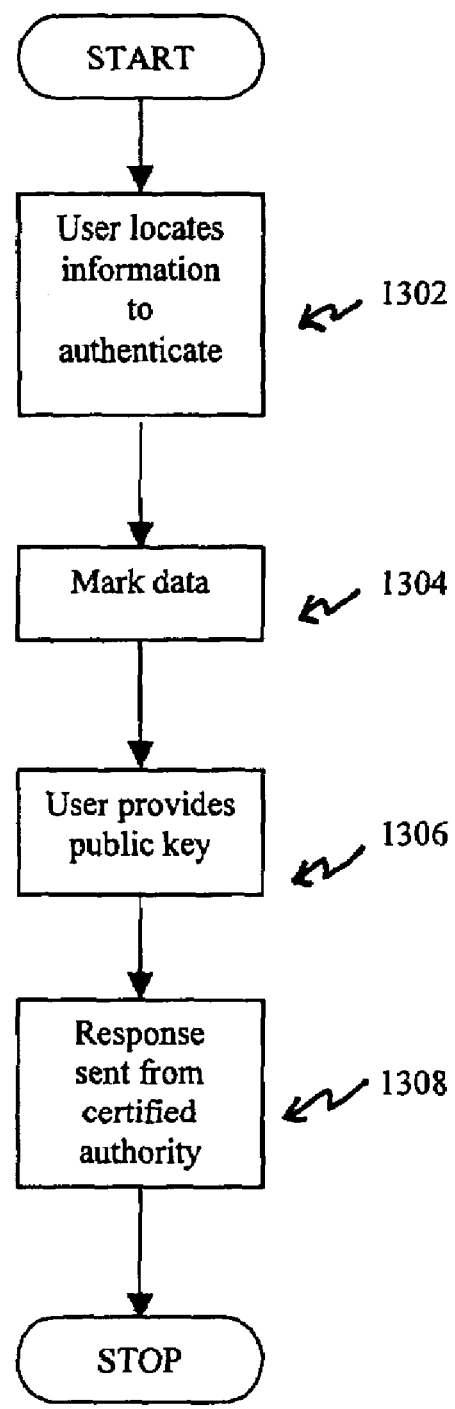
FIG. 13 is a flowchart depicting an authentication process according to one embodiment of the present invention.

Referring to FIG. 13, a method of use for an authentication device is provided. In step 1302, a user locates information to be authenticated. This may include a variety of information. The information is then entered into the authentication device.

In step 1304, perceptible data is marked with a public key secure watermark.

In one embodiment, this may be done in real time.

In step 1306, the user provides a public key to initiate the authentication.

In step 1308, a response is sent from the certification authority, or additional prompts for higher access levels are provided.

In one embodiment, transmissions between any elements may be over a secure communication link, including SSL or similar transmission exchange.

In another embodiment of the present invention, an authentication device may comprise a Internet web browser. For example, the authentication device may be a "plug in" for a web browser. Such a authentication device may be used to verify, or authenticate, items on web pages. For instance, according to one embodiment of the present invention, the authentication device may be used to verify that an Internet bank that displays the FDIC logo is authorized to display this logo. In one embodiment, real time verification will allow a user to verify such, and govern transactions accordingly.

It will be evident to those of ordinary skill in the art that the above-described modes and embodiments of the present invention, while they disclose useful aspects of the present invention and its advantages, are illustrative and exemplary only, and do not describe or delimit the spirit and scope of the present invention, which are limited only by the claims that follow below.

I claim:

1. A method for conducting a trusted transaction between at least two parties, comprising:

establishing a steganographic cipher for identifying information, wherein the steganographic cipher is governed by at least the following elements: a predetermined key, a predetermined message, and a predetermined carrier signal;

exchanging secondary value added information between the parties, wherein the secondary value added information is comprised of value adding components that can modify perceptibility, functionality or combinations thereof, of the primary value added information;

agreeing to at least one term for the exchange of primary value added information, wherein the term is associated with one of price, service, selection or combinations thereof; and facilitating payment for the transaction.

2. The method of claim 1, wherein the step of facilitating payment for the transaction is accomplished in real-time.

3. The method of claim 1, wherein the step of facilitating payment for the transaction is based on the at least one term for the primary value added information exchange.

4. The method of claim 1, wherein the transaction is governed by at least an age and a geographical limitation.

5. The method of claim 1, wherein the transaction is governed by at least legal restrictions which apply to at least one of the parties, a timing of the transaction, a geographic location of the transaction, and value added information.

6. The method of claim 1, wherein the value added information is represented physically.

7. A method for secure transaction, comprising:
receiving a request to process a transaction;
establishing a steganographic cipher, the steganographic cipher governed by at least the following elements: a predetermined key, a predetermined message, and a predetermined carrier signal to identify information associated with the transaction;
uniquely identifying the source of the request;
uniquely identifying at least one term of the request, wherein the term is associated with one of price, service, selection or combinations thereof; and
storing the generated identification information for transaction negotiation.

8. The method of claim 7, wherein the at least one term of the request includes at least one of a condition and a timing of the request.

9. The method of claim 7, wherein the request may be received over at least one of a secure and an unsecure transmission line.

10. The method of claim 7, wherein the source of the request is identified by at least one of a determinable origin of the source and a predetermined routing of the request by the seller.

11. The method of claim 7, wherein the at least one term of the request comprises a value adding component.

12. The method of claim 7, wherein the transaction is noncontiguous with the request.

13. The method of claim 7, wherein the transaction and the request are processed in real time.

14. A device for conducting a trusted transaction between at least two parties who have agreed to transact, comprising:
means for uniquely identifying information selected from the group consisting of a unique identification of one of the parties, a unique identification of the transaction, a unique identification of value added information to be transacted, a unique identification of a value adding component;
a steganographic cipher for generating said unique identification information, wherein the steganographic cipher is governed by at least the following elements: a predetermined key, a predetermined message, and a predetermined carrier signal; and
a means for verifying an agreement to transact between the parties.

15. The device of claim 14, wherein the unique identification information seeds the steganographic cipher.

16. The device of claim 14, wherein the unique identification information is verifiable.

17. The device of claim 14, further comprising:
means for transmitting value added information.

18. The device of claim 17, wherein the means for transmitting value added information transmits the value added information by a method selected from the group consisting of electronic and physical.

19. The device of claim 17, wherein the means for transmitting value added information transmits the value added information in a medium selected from the group consisting of a pre-determined file format and a predetermined carrier medium.

20. A device for conducting a trusted transaction between at least two parties who have agreed to transact, comprising:
means for agreeing on a steganographic cipher, the steganographic cipher governed by at least the following elements: a predetermined key, a predetermined message, and a predetermined carrier signal;
means for uniquely identifying unique identification information selected from the group consisting of a unique identification of one of the parties, a unique identification of the transaction, a unique identification of value added information to be transacted, and a unique identification of a value adding component; and
means for enabling a subsequent mutually agreed to at least one term wherein the terms consists of one of price, service, selection or combinations thereof.

21. The method of claim 20, wherein the at least one subsequent term concerns at least one of equity, service, and recognition.

* * * * *

UNITED STATES PATENT AND TRADEMARK OFFICE
CERTIFICATE OF CORRECTION

PATENT NO. : 7,159,116 B2
APPLICATION NO. : 09/731040
DATED : January 2, 2007
INVENTOR(S) : Scott A. Moskowitz It is certified that error appears in the above-identified patent and that said Letters Patent is hereby corrected as shown below:

| Column | Line | |
|---|---|---|
| 8 | 55 | Change "securitizing" to --securing-- |
| 9 | 15 | Change "data" to --data.-- |
| 11 | 38 | Change "offer" to --offer,-- |
| 13 | 33 | Change "fall" to --full-- |
| 14 | 65 | Change "is" to --are-- |
| 19 | 50 | Change "cryptographic" to --cryptography-- |
| 22 | 1 | Change "of device" to --of the device-- |
| 22 | 19 | Change "seller" to --sellers-- |
| 23 | 57 | Change "valuable contemplated" to --valuable and contemplated-- |
| 30 | 14 | Change "perceptible" to --perceptible"-- |
| 33 | 47 | Change "and" to --a-- |
| 34 | 22 | Change "according the" to --according to the-- |
| 35 | 51 | Change "goods" to --goods,-- |
| 36 | 27 | Change "adjustments" to --adjustment-- |

Signed and Sealed this

Eighteenth Day of December, 2007

JON W. DUDAS
*Director of the United States Patent and Trademark Office*